(12) United States Patent
Adusumilli et al.

(10) Patent No.: US 11,363,656 B2
(45) Date of Patent: Jun. 14, 2022

(54) TECHNIQUES FOR INDICATING FULL CONFIGURATION TO A SECONDARY NODE IN DUAL CONNECTIVITY

(71) Applicant: QUALCOMM Incorporated, San Diego, CA (US)

(72) Inventors: Neel Tej Adusumilli, Hyderabad (IN); Xipeng Zhu, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 16/872,843

(22) Filed: May 12, 2020

(65) Prior Publication Data

US 2021/0051749 A1 Feb. 18, 2021

(51) Int. Cl.
*H04W 24/10* (2009.01)
*H04W 28/08* (2009.01)
(Continued)

(52) U.S. Cl.
CPC .......... *H04W 76/15* (2018.02); *H04W 24/10* (2013.01); *H04W 28/0815* (2020.05);
(Continued)

(58) Field of Classification Search
CPC ... H04B 7/02–026; H04L 5/003–0098; H04W 8/22–245; H04W 24/02–10;
(Continued)

(56) References Cited

U.S. PATENT DOCUMENTS

2018/0124612 A1\* 5/2018 Babaei ................ H04W 72/042
2020/0329365 A1\* 10/2020 Luo ................... H04W 36/0055
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 15)", 3GPP Standard, Technical Specification, 3GPP TS 36.300, 3rd Generation Partnership Project (3GPP), Mobile Competence Centre, 650, Route Des Lucioles, F-06921 Sophia-Anti Polis Cedex, France, vol. RAN WG2, No. V15.6.0, Jun. 29, 2019 (Jun. 29, 2019), pp. 1-365, XP051754468, [retrieved on Jun. 29, 2019] p. 117-p. 130.

(Continued)

*Primary Examiner* — Timothy J Weidner
(74) *Attorney, Agent, or Firm* — Dalei Dong; Holland & Hart LLP

(57) ABSTRACT

Methods, systems, and devices for wireless communications are described. In some systems, a master node (MN) may determine to reconfigure a user equipment (UE) from an existing configuration to a full configuration for a dual connectivity (DC) mode. To perform the reconfiguration, the MN may transmit a signal (e.g., a modification request message) indicating the full configuration to a secondary node (SN). The SN may identify the full configuration reconfiguration triggered at the MN based on the signal. The SN may transmit an acknowledgment message to the MN including a secondary cell group (SCG) configuration for the SN complying with the full configuration. The MN may indicate this SCG configuration as part of the full configuration to the UE (e.g., in a radio resource control (RRC) connection reconfiguration message). The UE may perform a reconfiguration process and communicate with the MN and the SN according to the full configuration.

24 Claims, 16 Drawing Sheets

(51) Int. Cl.
*H04W 36/00* (2009.01)
*H04W 72/04* (2009.01)
*H04W 76/15* (2018.01)
*H04W 76/16* (2018.01)
*H04W 76/19* (2018.01)
*H04W 76/20* (2018.01)
*H04W 76/25* (2018.01)
*H04W 76/27* (2018.01)
*H04W 76/30* (2018.01)
*H04W 76/34* (2018.01)
*H04W 80/08* (2009.01)
*H04W 84/04* (2009.01)
*H04W 88/06* (2009.01)
*H04W 88/10* (2009.01)
*H04W 92/02* (2009.01)
*H04W 92/10* (2009.01)
*H04W 92/20* (2009.01)

(52) U.S. Cl.
CPC ..... *H04W 36/0069* (2018.08); *H04W 72/042* (2013.01); *H04W 76/16* (2018.02); *H04W 76/19* (2018.02); *H04W 76/20* (2018.02); *H04W 76/25* (2018.02); *H04W 76/27* (2018.02); *H04W 76/30* (2018.02); *H04W 76/34* (2018.02); *H04W 80/08* (2013.01); *H04W 84/042* (2013.01); *H04W 88/06* (2013.01); *H04W 88/10* (2013.01); *H04W 92/02* (2013.01); *H04W 92/10* (2013.01); *H04W 92/20* (2013.01)

(58) Field of Classification Search
CPC ........... H04W 28/02–26; H04W 36/0005–385; H04W 48/02–20; H04W 60/005–06; H04W 72/005–14; H04W 74/005–008; H04W 76/10–50; H04W 80/02–12; H04W 84/005–22; H04W 88/005–188; H04W 92/02–24
See application file for complete search history.

(56) References Cited

U.S. PATENT DOCUMENTS

2021/0219193 A1* 7/2021 Teyeb ............... H04W 36/0069
2021/0243656 A1* 8/2021 Paterson ........... H04W 36/0033
2021/0258214 A1* 8/2021 Toeda ............... H04W 36/0055

OTHER PUBLICATIONS

International Search Report and Written Opinion - PCT/US2020/042040—ISA/EPO—dated Oct. 28, 2020.

* cited by examiner

TECHNIQUES FOR INDICATING FULL CONFIGURATION TO A SECONDARY NODE IN DUAL CONNECTIVITY

CROSS REFERENCE

The present Applications for Patent claims the benefit of Indian Provisional Patent Application No. 201941032912 by Adusumilli et al., entitled "TECHNIQUES FOR INDICATING FULL CONFIGURATION INDICATION TO A SECONDARY NODE IN DUAL CONNECTIVITY," filed Aug. 14, 2019 and assigned to the assignee hereof, which is hereby incorporated by reference in its entirety.

FIELD OF DISCLOSURE

The present disclosure, for example, relates to wireless communications systems and more particularly to techniques for indicating full configuration to a secondary node (SN) in dual connectivity (DC).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support a UE operating in a dual connectivity (DC) mode. In the DC mode, the UE may concurrently communicate on multiple component carriers (CCs) with multiple cells. For example, the UE may transmit and receive data on CCs from two cell groups (e.g., a master cell group (MCG) and a secondary cell group (SCG)) via a Master node (MN) and a Secondary node (SN). The MN and the SN may operate using the same or different radio access technologies (e.g., LTE, LTE-A, LTE-A Pro, NR, etc.). For example, the MN may be an example of an LTE base station while the SN may be an example of an NR base station or vice versa, among other examples. The UE may communicate with the MN and the SN in the DC mode according to a configuration (e.g., a cell configuration). In some cases, the MN may determine to apply a full configuration to the UE, which may cause the UE to release its existing configuration and apply a new configuration provided by the MN. Because the UE also communicates with the SN in the DC mode, the SN may be associated with the existing configuration and may be affected by the reconfiguration.

In a DC mode, the MN may not be able to efficiently indicate to an SN that a full configuration is to be implemented by the MN. When the MN determines to perform a reconfiguration with a full configuration at the UE, the SN may need to provide a new configuration in order for the UE to perform a reconfiguration process using the full configuration. For the SN to provide the new configuration, the MN may transmit a release request to the SN. The SN may release its connection with the MN based on this release request, and the SN may be re-added by the MN based on an addition request. When a connection is re-added between the SN and the MN, the SN may transmit the new configuration to the MN. The MN may signal to the UE that the existing configuration received from the SN is no longer valid and provide the new configuration to the UE as part of the full configuration via radio resource control (RRC) signaling. The release and addition requests and acknowledgments between the MN and SN may cause procedure latency when reconfiguring a UE and may decrease DC communication efficiency in the wireless communications system.

SUMMARY

The present disclosure relates to improved methods, systems, devices, and apparatuses that support techniques for indicating full configuration to a secondary node (SN) in dual connectivity (DC). For example, the present disclosure provides for reconfiguring a user equipment (UE) operating in a DC mode with a full configuration.

In some wireless communications systems, a UE may communicate with a master node (MN) and an SN according to a DC mode of operations. The MN may determine to reconfigure the UE operating in the DC mode with a full configuration. The MN may transmit an indication that communicates to the SN the intention to reconfigure the UE with the full configuration. The indication may be an example of a modification request to the SN and may include a bit or field indicating the full configuration. The SN may acknowledge the request and provide a full secondary cell group (SCG) configuration to the MN. The MN may signal the full configuration, including the full SCG configuration, to the UE via radio resource control (RRC) signaling. The UE may indicate to the MN that the reconfiguration is complete via RRC signaling, and the MN may indicate to the SN that the reconfiguration is complete. The UE may communicate with the MN and the SN via the new configuration. These techniques may bypass the use of additional signaling (e.g., a release-and-add procedure) and may reduce the latency caused by the release and re-addition of the SN when switching to a full configuration.

A method for wireless communications at a first device is described. The method may include communicating with a second device and a third device in a DC mode, receiving, from the second device, an RRC connection reconfiguration message indicating a full configuration for the first device, where the full configuration is based on a modification request message transmitted from the second device to the third device and indicating the full configuration, performing a reconfiguration process according to the full configuration, and communicating with the second device and the third device in the DC mode based on the reconfiguration process.

In some examples of the method described herein, performing the reconfiguration process according to the full configuration may include releasing a set of first dedicated radio configurations based on the full configuration and establishing a set of second dedicated radio configurations according to the full configuration.

In some examples of the method described herein, a DC release-and-add indicator of the RRC connection reconfiguration message may be set to false.

In some examples of the method described herein, the RRC connection reconfiguration message further indicates an SCG configuration complying with the full configuration, a resource configuration, and a measurement configuration for the first device, where the reconfiguration process may be further based on the SCG configuration, the resource configuration, and the measurement configuration.

Some examples of the method described herein may further include transmitting, to the second device, an RRC connection reconfiguration complete message in response to the RRC connection reconfiguration message and based on performing the reconfiguration process.

In some examples of the method described herein, the DC mode includes an evolved universal terrestrial radio access (EUTRA)-EUTRA DC mode, a new radio (NR)-NR DC mode, an NR-EUTRA DC mode, an EUTRA-NR DC mode, a next generation core (NGC) EUTRA-NR DC mode, or a combination thereof.

In some examples of the method described herein, the first device may be an example of a UE, the second device may be an example of an MN, and the third device may be an example of an SN.

An apparatus for wireless communications at a first device is described. The apparatus may include a processor, memory coupled with the processor, and instructions stored in the memory. The instructions may be executable by the processor to cause the apparatus to communicate with a second device and a third device in a DC mode, receive, from the second device, an RRC connection reconfiguration message indicating a full configuration for the first device, where the full configuration is based on a modification request message transmitted from the second device to the third device and indicating the full configuration, perform a reconfiguration process according to the full configuration, and communicate with the second device and the third device in the DC mode based on the reconfiguration process.

In some examples of the apparatus described herein, the instructions to perform the reconfiguration process according to the full configuration may be executable by the processor to cause the apparatus to release a set of first dedicated radio configurations based on the full configuration and establish a set of second dedicated radio configurations according to the full configuration.

In some examples of the apparatus described herein, a DC release-and-add indicator of the RRC connection reconfiguration message may be set to false.

In some examples of the apparatus described herein, the RRC connection reconfiguration message further indicates an SCG configuration complying with the full configuration, a resource configuration, and a measurement configuration for the first device, where the reconfiguration process may be further based on the SCG configuration, the resource configuration, and the measurement configuration.

Some examples of the apparatus described herein may further include instructions executable by the processor to cause the apparatus to transmit, to the second device, an RRC connection reconfiguration complete message in response to the RRC connection reconfiguration message and based on performing the reconfiguration process.

In some examples of the apparatus described herein, the DC mode includes an EUTRA-EUTRA DC mode, an NR-NR DC mode, an NR-EUTRA DC mode, an EUTRA-NR DC mode, an NGC EUTRA-NR DC mode, or a combination thereof.

In some examples of the apparatus described herein, the first device may be an example of a UE, the second device may be an example of an MN, and the third device may be an example of an SN.

Another apparatus for wireless communications at a first device is described. The apparatus may include means for communicating with a second device and a third device in a DC mode, receiving, from the second device, an RRC connection reconfiguration message indicating a full configuration for the first device, where the full configuration is based on a modification request message transmitted from the second device to the third device and indicating the full configuration, performing a reconfiguration process according to the full configuration, and communicating with the second device and the third device in the DC mode based on the reconfiguration process.

In some examples of the apparatus described herein, the means to perform the reconfiguration process according to the full configuration may include means for releasing a set of first dedicated radio configurations based on the full configuration and establishing a set of second dedicated radio configurations according to the full configuration.

In some examples of the apparatus described herein, a DC release-and-add indicator of the RRC connection reconfiguration message may be set to false.

In some examples of the apparatus described herein, the RRC connection reconfiguration message further indicates an SCG configuration complying with the full configuration, a resource configuration, and a measurement configuration for the first device, where the reconfiguration process may be further based on the SCG configuration, the resource configuration, and the measurement configuration.

Some examples of the apparatus described herein may further include means for transmitting, to the second device, an RRC connection reconfiguration complete message in response to the RRC connection reconfiguration message and based on performing the reconfiguration process.

In some examples of the apparatus described herein, the DC mode includes an EUTRA-EUTRA DC mode, an NR-NR DC mode, an NR-EUTRA DC mode, an EUTRA-NR DC mode, an NGC EUTRA-NR DC mode, or a combination thereof.

In some examples of the apparatus described herein, the first device may be an example of a UE, the second device may be an example of an MN, and the third device may be an example of an SN.

A non-transitory computer-readable medium storing code for wireless communications at a first device is described. The code may include instructions executable by a processor to communicate with a second device and a third device in a DC mode, receive, from the second device, an RRC connection reconfiguration message indicating a full configuration for the first device, where the full configuration is based on a modification request message transmitted from the second device to the third device and indicating the full configuration, perform a reconfiguration process according to the full configuration, and communicate with the second device and the third device in the DC mode based on the reconfiguration process.

In some examples of the non-transitory computer-readable medium described herein, the instructions to perform the reconfiguration process according to the full configuration may be executable by the processor to release a set of first dedicated radio configurations based on the full configuration and establish a set of second dedicated radio configurations according to the full configuration.

In some examples of the non-transitory computer-readable medium described herein, a DC release-and-add indicator of the RRC connection reconfiguration message may be set to false.

In some examples of the non-transitory computer-readable medium described herein, the RRC connection reconfiguration message further indicates an SCG configuration complying with the full configuration, a resource configuration, and a measurement configuration for the first device, where the reconfiguration process may be further based on the SCG configuration, the resource configuration, and the measurement configuration.

Some examples of the non-transitory computer-readable medium described herein may further include instructions executable by the processor to transmit, to the second device, an RRC connection reconfiguration complete message in response to the RRC connection reconfiguration message and based on performing the reconfiguration process.

In some examples of the non-transitory computer-readable medium described herein, the DC mode includes an EUTRA-EUTRA DC mode, an NR-NR DC mode, an NR-EUTRA DC mode, an EUTRA-NR DC mode, an NGC EUTRA-NR DC mode, or a combination thereof.

In some examples of the non-transitory computer-readable medium described herein, the first device may be an example of a UE, the second device may be an example of an MN, and the third device may be an example of an SN.

A method for wireless communications at a first device is described. The method may include determining to reconfigure a second device operating in a DC mode with a full configuration, transmitting, to a third device, a modification request message indicating the full configuration based on the determining, and receiving, from the third device, a modification request acknowledge (ACK) message including an SCG configuration complying with the full configuration.

Some examples of the method described herein may further include transmitting, to the second device, an RRC connection reconfiguration message indicating the full configuration and the SCG configuration.

In some examples of the method described herein, a DC release-and-add indicator of the RRC connection reconfiguration message may be set to false.

In some examples of the method described herein, the RRC connection reconfiguration message further indicates a resource configuration and a measurement configuration for the second device.

Some examples of the method described herein may further include receiving, from the second device, an RRC connection reconfiguration complete message in response to the RRC connection reconfiguration message and communicating with the second device according to the full configuration.

Some examples of the method described herein may further include transmitting, to the third device, a reconfiguration complete indication message based on receiving the RRC connection reconfiguration complete message.

Some examples of the method described herein may further include maintaining a connection with the third device based on transmitting the modification request message.

In some examples of the method described herein, the full configuration indicates for the second device to release a set of first dedicated radio configurations and establish a set of second dedicated radio configurations according to the full configuration.

In some examples of the method described herein, determining to reconfigure the second device with the full configuration further may include performing a handover procedure for the second device to a cell applying the full configuration, performing a packet data convergence protocol (PDCP) bearer type change to the full configuration, modifying a dedicated physical configuration to the full configuration, or a combination thereof.

In some examples of the method described herein, the DC mode includes an EUTRA-EUTRA DC mode, a NR-NR DC mode, an NR-EUTRA DC mode, an EUTRA-NR DC mode, an NGC EUTRA-NR DC mode, or a combination thereof.

In some examples of the method described herein, the first device may be an example of an MN, the second device may be an example of a UE, and the third device may be an example of an SN.

An apparatus for wireless communications at a first device is described. The apparatus may include a processor, memory coupled with the processor, and instructions stored in the memory. The instructions may be executable by the processor to cause the apparatus to determine to reconfigure a second device operating in a DC mode with a full configuration, transmit, to a third device, a modification request message indicating the full configuration based on the determining, and receive, from the third device, a modification request ACK message including an SCG configuration complying with the full configuration.

Some examples of the apparatus described herein may further include instructions executable by the processor to cause the apparatus to transmit, to the second device, an RRC connection reconfiguration message indicating the full configuration and the SCG configuration.

In some examples of the apparatus described herein, a DC release-and-add indicator of the RRC connection reconfiguration message may be set to false.

In some examples of the apparatus described herein, the RRC connection reconfiguration message further indicates a resource configuration and a measurement configuration for the second device.

Some examples of the apparatus described herein may further include instructions executable by the processor to cause the apparatus to receive, from the second device, an RRC connection reconfiguration complete message in response to the RRC connection reconfiguration message and communicate with the second device according to the full configuration.

Some examples of the apparatus described herein may further include instructions executable by the processor to cause the apparatus to transmit, to the third device, a reconfiguration complete indication message based on receiving the RRC connection reconfiguration complete message.

Some examples of the apparatus described herein may further include instructions executable by the processor to cause the apparatus to maintain a connection with the third device based on transmitting the modification request message.

In some examples of the apparatus described herein, the full configuration indicates for the second device to release a set of first dedicated radio configurations and establish a set of second dedicated radio configurations according to the full configuration.

In some examples of the apparatus described herein, the instructions to determine to reconfigure the second device with the full configuration may be further executable by the processor to cause the apparatus to perform a handover procedure for the second device to a cell applying the full configuration, perform a PDCP bearer type change to the full configuration, modify a dedicated physical configuration to the full configuration, or a combination thereof.

In some examples of the apparatus described herein, the DC mode includes an EUTRA-EUTRA DC mode, an NR-NR DC mode, an NR-EUTRA DC mode, an EUTRA-NR DC mode, an NGC EUTRA-NR DC mode, or a combination thereof.

In some examples of the apparatus described herein, the first device may be an example of an MN, the second device may be an example of a UE, and the third device may be an example of an SN.

Another apparatus for wireless communications at a first device is described. The apparatus may include means for determining to reconfigure a second device operating in a DC mode with a full configuration, transmitting, to a third device, a modification request message indicating the full configuration based on the determining, and receiving, from the third device, a modification request ACK message including an SCG configuration complying with the full configuration.

Some examples of the apparatus described herein may further include means for transmitting, to the second device, an RRC connection reconfiguration message indicating the full configuration and the SCG configuration.

In some examples of the apparatus described herein, a DC release-and-add indicator of the RRC connection reconfiguration message may be set to false.

In some examples of the apparatus described herein, the RRC connection reconfiguration message further indicates a resource configuration and a measurement configuration for the second device.

Some examples of the apparatus described herein may further include means for receiving, from the second device, an RRC connection reconfiguration complete message in response to the RRC connection reconfiguration message and communicating with the second device according to the full configuration.

Some examples of the apparatus described herein may further include means for transmitting, to the third device, a reconfiguration complete indication message based on receiving the RRC connection reconfiguration complete message.

Some examples of the apparatus described herein may further include means for maintaining a connection with the third device based on transmitting the modification request message.

In some examples of the apparatus described herein, the full configuration indicates for the second device to release a set of first dedicated radio configurations and establish a set of second dedicated radio configurations according to the full configuration.

In some examples of the apparatus described herein, the means for determining to reconfigure the second device with the full configuration further may include means for performing a handover procedure for the second device to a cell applying the full configuration, performing a PDCP bearer type change to the full configuration, modifying a dedicated physical configuration to the full configuration, or a combination thereof.

In some examples of the apparatus described herein, the DC mode includes an EUTRA-EUTRA DC mode, an NR-NR DC mode, an NR-EUTRA DC mode, an EUTRA-NR DC mode, an NGC EUTRA-NR DC mode, or a combination thereof.

In some examples of the apparatus described herein, the first device may be an example of an MN, the second device may be an example of a UE, and the third device may be an example of an SN.

A non-transitory computer-readable medium storing code for wireless communications at a first device is described. The code may include instructions executable by a processor to determine to reconfigure a second device operating in a DC mode with a full configuration, transmit, to a third device, a modification request message indicating the full configuration based on the determining, and receive, from the third device, a modification request ACK message including an SCG configuration complying with the full configuration.

Some examples of the non-transitory computer-readable medium described herein may further include instructions executable by the processor to transmit, to the second device, an RRC connection reconfiguration message indicating the full configuration and the SCG configuration.

In some examples of the non-transitory computer-readable medium described herein, a DC release-and-add indicator of the RRC connection reconfiguration message may be set to false.

In some examples of the non-transitory computer-readable medium described herein, the RRC connection reconfiguration message further indicates a resource configuration and a measurement configuration for the second device.

Some examples of the non-transitory computer-readable medium described herein may further include instructions executable by the processor to receive, from the second device, an RRC connection reconfiguration complete message in response to the RRC connection reconfiguration message and communicating with the second device according to the full configuration.

Some examples of the non-transitory computer-readable medium described herein may further include instructions executable by the processor to transmit, to the third device, a reconfiguration complete indication message based on receiving the RRC connection reconfiguration complete message.

Some examples of the non-transitory computer-readable medium described herein may further include instructions executable by the processor to maintain a connection with the third device based on transmitting the modification request message.

In some examples of the non-transitory computer-readable medium described herein, the full configuration indicates for the second device to release a set of first dedicated radio configurations and establish a set of second dedicated radio configurations according to the full configuration.

In some examples of the non-transitory computer-readable medium described herein, the instructions to determine to reconfigure the second device with the full configuration may be further executable by the processor to perform a handover procedure for the second device to a cell applying the full configuration, perform a PDCP bearer type change to the full configuration, modify a dedicated physical configuration to the full configuration, or a combination thereof.

In some examples of the non-transitory computer-readable medium described herein, the DC mode includes an EUTRA-EUTRA DC mode, an NR-NR DC mode, an NR-EUTRA DC mode, an EUTRA-NR DC mode, an NGC EUTRA-NR DC mode, or a combination thereof.

In some examples of the non-transitory computer-readable medium described herein, the first device may be an example of an MN, the second device may be an example of a UE, and the third device may be an example of an SN.

A method for wireless communications at a first device is described. The method may include receiving, from a second device, a modification request message indicating a full configuration reconfiguration for a third device operating in a DC mode, transmitting, to the second device, a modification request ACK message including an SCG configuration complying with the full configuration, and communicating with the third device according to the SCG configuration.

Some examples of the method described herein may further include receiving, from the second device, a reconfiguration complete indication message, where the communicating with the third device may be based on the reconfiguration complete indication message.

Some examples of the method described herein may further include maintaining a connection with the second device based on receiving the modification request message.

In some examples of the method described herein, the DC mode includes an EUTRA-EUTRA DC mode, an NR-NR DC mode, an NR-EUTRA DC mode, an EUTRA-NR DC mode, an NGC EUTRA-NR DC mode, or a combination thereof.

In some examples of the method described herein, the first device may be an example of an SN, the second device may be an example of an MN, and the third device may be an example of a UE.

An apparatus for wireless communications at a first device is described. The apparatus may include a processor, memory coupled with the processor, and instructions stored in the memory. The instructions may be executable by the processor to cause the apparatus to receive, from a second device, a modification request message indicating a full configuration reconfiguration for a third device operating in a DC mode, transmit, to the second device, a modification request ACK message including an SCG configuration complying with the full configuration, and communicate with the third device according to the SCG configuration.

Some examples of the apparatus described herein may further include instructions executable by the processor to cause the apparatus to receive, from the second device, a reconfiguration complete indication message, where the communicating with the third device may be based on the reconfiguration complete indication message.

Some examples of the apparatus described herein may further include instructions executable by the processor to cause the apparatus to maintain a connection with the second device based on receiving the modification request message.

In some examples of the apparatus described herein, the DC mode includes an EUTRA-EUTRA DC mode, an NR-NR DC mode, an NR-EUTRA DC mode, an EUTRA-NR DC mode, an NGC EUTRA-NR DC mode, or a combination thereof.

In some examples of the apparatus described herein, the first device may be an example of an SN, the second device may be an example of an MN, and the third device may be an example of a UE.

Another apparatus for wireless communications at a first device is described. The apparatus may include means for receiving, from a second device, a modification request message indicating a full configuration reconfiguration for a third device operating in a DC mode, transmitting, to the second device, a modification request ACK message including an SCG configuration complying with the full configuration, and communicating with the third device according to the SCG configuration.

Some examples of the apparatus described herein may further include means for receiving, from the second device, a reconfiguration complete indication message, where the communicating with the third device may be based on the reconfiguration complete indication message.

Some examples of the apparatus described herein may further include means for maintaining a connection with the second device based on receiving the modification request message.

In some examples of the apparatus described herein, the DC mode includes an EUTRA-EUTRA DC mode, an NR-NR DC mode, an NR-EUTRA DC mode, an EUTRA-NR DC mode, an NGC EUTRA-NR DC mode, or a combination thereof.

In some examples of the apparatus described herein, the first device may be an example of an SN, the second device may be an example of an MN, and the third device may be an example of a UE.

A non-transitory computer-readable medium storing code for wireless communications at a first device is described. The code may include instructions executable by a processor to receive, from a second device, a modification request message indicating a full configuration reconfiguration for a third device operating in a DC mode, transmit, to the second device, a modification request ACK message including an SCG configuration complying with the full configuration, and communicate with the third device according to the SCG configuration.

Some examples of the non-transitory computer-readable medium described herein may further include instructions executable by the processor to receive, from the second device, a reconfiguration complete indication message, where the communicating with the third device may be based on the reconfiguration complete indication message.

Some examples of the non-transitory computer-readable medium described herein may further include instructions executable by the processor to maintain a connection with the second device based on receiving the modification request message.

In some examples of the non-transitory computer-readable medium described herein, the DC mode includes an EUTRA-EUTRA DC mode, an NR-NR DC mode, an NR-EUTRA DC mode, an EUTRA-NR DC mode, an NGC EUTRA-NR DC mode, or a combination thereof.

In some examples of the non-transitory computer-readable medium described herein, the first device may be an example of an SN, the second device may be an example of an MN, and the third device may be an example of a UE.

DETAILED DESCRIPTION

Figure 1:
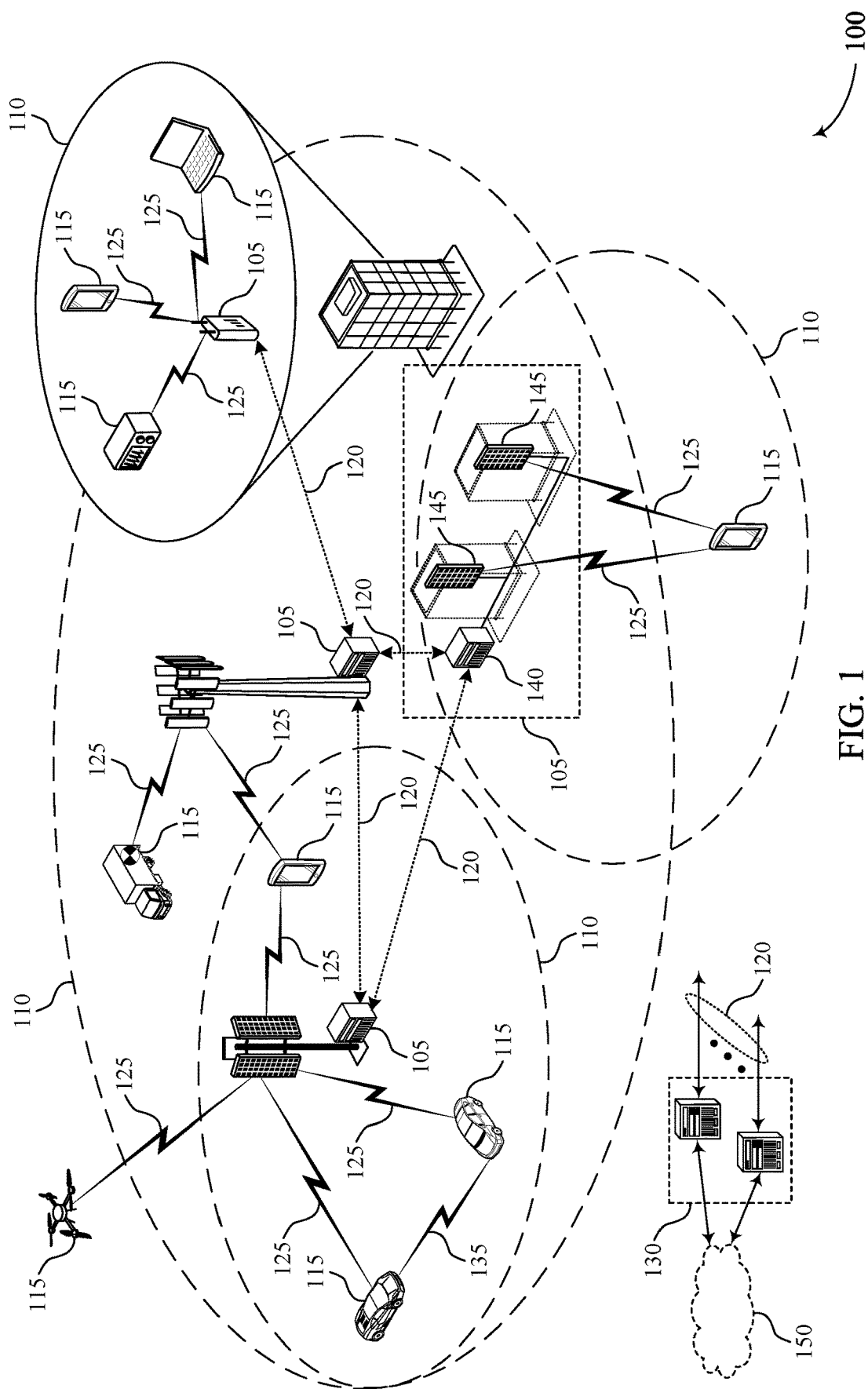
FIGS. 1 and 2 illustrate examples of wireless communications systems that support techniques for indicating full configuration to a secondary node (SN) in dual connectivity (DC) in accordance with various aspects of the present disclosure.

Some wireless communications systems may include communication devices, such as user equipment (UEs) and base stations, that support multiple radio access technologies. Examples of radio access technologies include fourth generation (4G) technologies, such as Long Term Evolution (LTE), and fifth generation (5G) technologies, such as New Radio (NR). A UE, in some examples, may communicate using one or more radio access technologies in accordance with operating in a dual connectivity (DC) mode. The DC mode may allow the communication device to concurrently communicate (e.g., transmit and receive information in the form of packets) on multiple component carriers (CCs) from at least two cell groups. For example, a UE may communicate with a master base station or master node (MN) (e.g., a master eNB (MeNB), a master gNB (MgNB), etc.) in a master cell group (MCG) and a secondary base station or secondary node (SN) (e.g., a secondary eNB (SeNB), a secondary gNB (SgNB), etc.) in a secondary cell group (SCG). The CCs may be configured into a primary cell associated with the MCG and a secondary cell associated with the SCG. In some examples, the master base station may correspond to the primary cell, while the secondary base station may correspond to the secondary cell.

The primary cell may, in some examples, correspond to one radio access technology while the secondary cell may correspond to another radio access technology. For example, the primary cell may correspond to LTE, while the secondary cell may correspond to NR. Alternatively, the primary cell may correspond to NR, while the secondary cell may correspond to LTE, or the primary and secondary cells may correspond to a same radio access technology. The communication devices may communicate with one or more of the primary cell or the secondary cell on one or more of the configured CCs.

In some cases, an MN may determine to reconfigure a UE operating in a DC mode with a full configuration. For example, the MN may identify a trigger for a reconfiguration process of the UE with a full configuration. In some systems, the MN may perform a release and re-add procedure with the SN to obtain an SCG configuration that complies with the full configuration. The release and re-addition of the SN may affect data continuity and may cause a delay in the UE applying the full configuration. The release and re-addition of the SN may additionally or alternatively result in radio link failure (RLF) in cases where the UE reaches a threshold number of retransmissions (e.g., max-retransmissions) during the release and re-add procedure (e.g., during which the SN may not receive communications from the UE based on being released from the connection with the MN).

In contrast, some systems may implement techniques for indicating full configuration to an SN in DC operations. For example, an MN may determine to apply a full configuration at a UE and may send a modification request message to the SN indicating the full configuration. The modification request message may contain information (e.g., a toggle bit, a bit field, etc.) indicating to the SN that a full configuration is to be reconfigured for the UE. For example, the information may include a configuration indication (e.g., RRC-Config-Ind) that is set to a full configuration and may indicate to the SN that an SCG configuration complying with the full configuration is requested at the MN. This indication of the full configuration may obviate a release and re-add procedure for the SN. As such, the SN may remain connected to the MN and may maintain support for communications with the UE. The SN may receive the modification request message including the configuration indication and may determine to transmit an SCG configuration back to the MN in response (e.g., based on the indication of the full configuration for the UE, based on an indication requesting the SCG configuration, etc.). Specifically, the full configuration indication in the modification request message may trigger the SN to include a full SCG configuration (e.g., an SCG configuration complying with the full configuration) in an acknowledgment (ACK) message to the MN. The MN may receive the SCG configuration for the full configuration from the SN in the modification request ACK message without releasing and re-adding the SN, and the MN may transmit an indication of the full configuration (e.g., including an MCG configuration for the MN and the SCG configuration for the SN) to the UE in radio resource control (RRC) signaling. The UE may perform a reconfiguration procedure for the DC mode based on the full configuration, where the UE may release a number of current configurations and establish a number of new configurations according to the indicated full configuration.

Aspects of the disclosure are initially described in the context of wireless communications systems. Additional aspects are described with respect to process flows. Aspects of the disclosure are further illustrated by and described with reference to apparatus diagrams, system diagrams, and flowcharts that relate to techniques for indicating full configuration to an SN in DC.

FIG. 1 illustrates an example of a wireless communications system that supports techniques for indicating full configuration to an SN in DC in accordance with various aspects of the present disclosure. The wireless communications system 100 may include base stations 105, UEs 115, and a core network 130. In some examples, the wireless communications system 100 may be an LTE network, an LTE-Advanced (LTE-A) network, an LTE-A Pro network, or an NR network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a geographic coverage area 110 over which UEs 115 and the base station 105 may establish communication links 125. The geographic coverage area 110 may be an example of a geographic area over which a base station 105 and a UE 115 support the communication of signals according to one or more radio access technologies.

UEs 115 may be dispersed throughout a geographic coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). For example, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at specific orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a specific orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In a DC mode, a UE 115 may concurrently communicate (e.g., maintain connections with) multiple CCs from multiple cells via multiple base stations 105, where a first base station 105 may act as an MN and a second base station 105 may act as an SN. A base station 105 operating as an MN may transmit, to a base station 105 operating as an SN, an indication that communicates a request to reconfigure the UE 115 with a full configuration. The indication may be a component of a modification request to the other base station 105 operating as the SN. The modification request may include an implicit (e.g., based on the indicated full configuration) or explicit request for a new SCG configuration for the SN. The SN may acknowledge the request and provide a full SCG configuration to the MN. The MN may signal the new SCG configuration to the UE 115 (e.g., as a portion of the full configuration), and the UE 115 may communicate with the MN and the SN according to the full configuration.

In some cases, the base stations 105 operating as the MN and SN may operate according to different combinations of radio access technologies supported by the DC mode. The base station 105 operating as the MN (or a network device controlling the MN) may determine to apply a full configuration to the UE 115, where the UE 115 may release an existing configuration and apply the full configuration provided in an RRC message. That is, rather than adjust one or more configurations according to differential or relative parameters, the full configuration may trigger the UE 115 to fully reset the one or more configurations using the parameters specified in the full configuration. This full configuration signaled by the MN may include the UE 115 releasing the SCG configuration with the SN.

Figure 2:
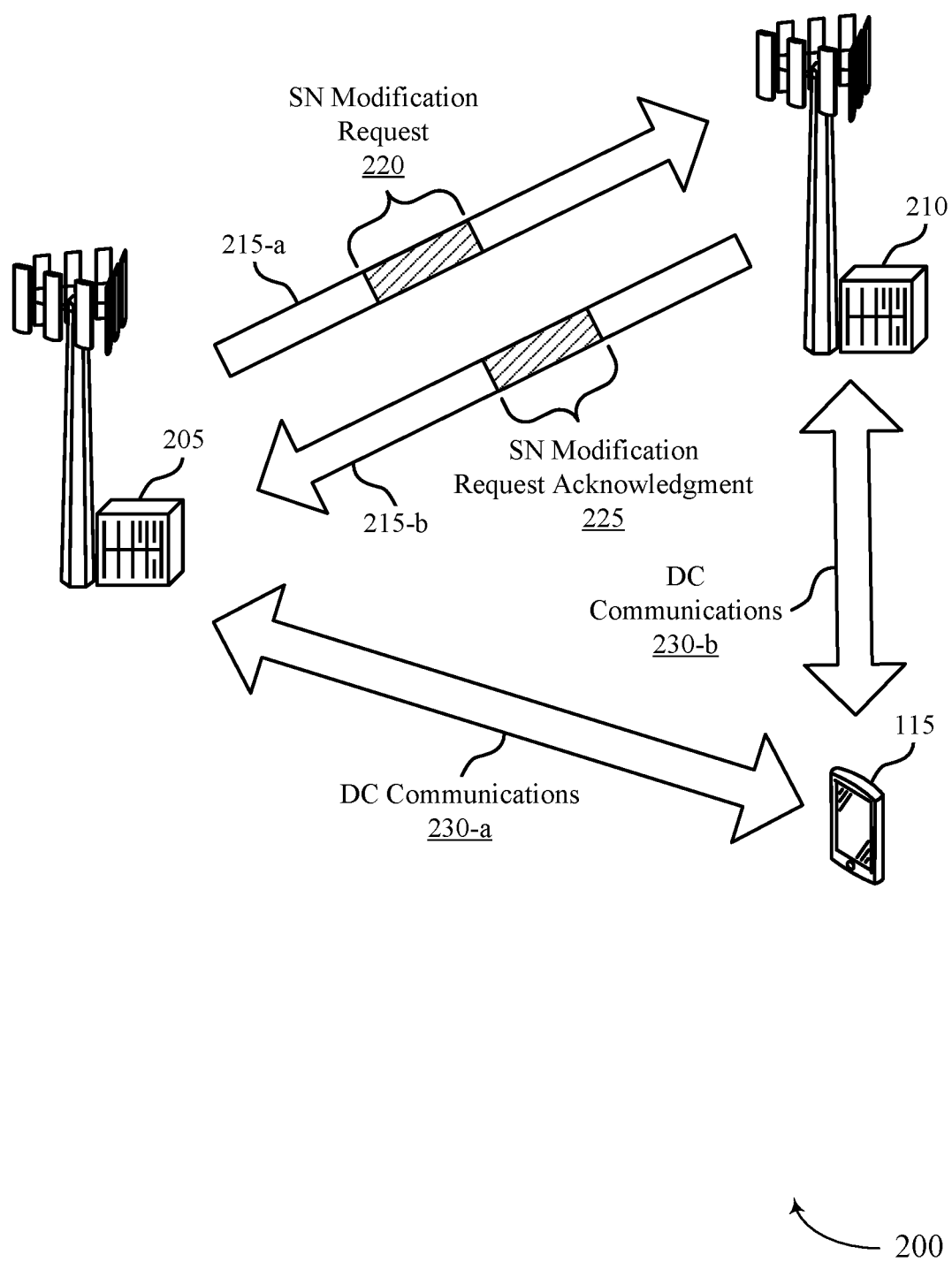

FIG. 2 illustrates an example of a wireless communications system that supports techniques for indicating full configuration to an SN in DC in accordance with various aspects of the present disclosure. In some examples, the wireless communications system 200 may implement aspects of a wireless communications system 100. For example, the wireless communications system 200 may include a UE 115 and base stations, which may be examples of a UE 115 and base stations 105 as described with reference to FIG. 1. One base station in the wireless communications system 200 may operate as an MN 205, while another base station may operate as an SN 210. The MN 205 and the SN 210 may support DC communications with the UE 115. The MN 205 and SN 210 may additionally support reconfiguration of the UE 115 with a full configuration triggered (e.g., initiated) by the MN 205.

The UE 115 may operate in a DC mode with a base station operating as an MN 205 and a base station operating as an SN 210. The MN 205 may provide network coverage for a cell in an MCG and the SN 210 may provide coverage for a cell in an SCG. Initially, the UE 115 may perform DC communications 230-a with the MN 205 according to a first MCG configuration and may perform DC communications 230-b with the SN 210 according to a first SCG configuration.

The wireless communications system 200 may support multiple DC mode types in which the UE 115, the MN 205, and the SN 210 may communicate. For example, the UE 115 may communicate with both the MN 205 and the SN 210 according to an E-UTRA configuration. In other examples, the UE 115 may communicate with both the MN 205 and the SN 210 according to an NR configuration. This type of DC mode may be known as NR-DC. In some examples, the UE 115 may communicate with the MN 205 according to an NR configuration and with the SN 210 according to an E-UTRA configuration in what may be referred to as NE-DC. Alternatively, in some other examples, the UE 115 may communicate with the MN 205 according to an E-UTRA configuration and with the SN 210 according to an NR configuration in what may be referred to as EN-DC. In yet other examples, the UE 115 may communicate with the MN 205 according to a next generation core (NGC) E-UTRA configuration and with the SN 210 according to an NR configuration in what may be known as NGEN-DC mode. The UE 115 may support any other DC mode types for communicating with the MN 205 and the SN 210.

A trigger may cause the MN 205 to reconfigure the UE 115 with the full configuration when the UE 115 is operating in a DC mode. For example, intra-radio access technology handover of the UE 115 with an SN modification may trigger the reconfiguration if the target cell (e.g., the cell covered by the MN 205) applies a full configuration. Additionally or alternatively, a PDCP type change of a bearer for the UE 115 with MobilityControlInfo and a full configuration may trigger the reconfiguration. Further, a PhysicalConfigDedicated configuration for the UE 115 implementing a full configuration may trigger the reconfiguration by the MN 205. Other processes or scenarios may trigger the MN 205 to reconfigure the UE 115 with a full configuration. Any such trigger may cause the MN 205 to communicate with the SN 210 to coordinate the full configuration for the UE 115.

In the wireless communications system 200, the MN 205 may communicate with the SN 210 over backhaul links 215. In some examples, a backhaul link 215 may be an example of a backhaul link 120 described with reference to FIG. 1 (e.g., a wired or wireless backhaul link). For example, the backhaul link 215 may be an example of an Xn or X2 communication link between base stations. The MN 205 may determine to reconfigure the UE 115 in a full configuration and may transmit an SN modification request 220 to the SN 210 over the backhaul link 215-a. The SN modification request 220 may directly indicate the determination by the MN 205 to reconfigure the UE 115 with the full configuration. The SN modification request 220 may further indicate to the SN 210 that a new SCG configuration is requested (e.g., for the full configuration). The SN modification request 220 may additionally or alternatively be used to add, release, or modify radio bearers. In some cases, a field of the SN modification request 220 may indicate that the MN is requesting a new SCG configuration in order to reconfigure the UE 115 according to a full configuration. For example, the field may be an example of an RRCConfigIndication field and may indicate a full configuration for the UE 115, a delta configuration for the UE 115, or any other supported configuration for the UE 115. In some cases, this RRCConfigIndication field may be optional within the SN modification request 220.

In response to the SN modification request 220, the SN 210 may transmit an SN modification request ACK 225 to the MN 205 over a backhaul link 215-b, where the SN modification request 220 provides the configuration to be applied by the SN 210 in the SN modification request ACK 225. The SN modification request ACK 225 may include an SCG configuration for the UE 115. This SCG configuration may be based on the indication of the full configuration and may comply with the full configuration. The MN 205 may receive the SN modification request ACK 225, determine the SCG configuration for the SN 210, and include the SCG configuration in an RRC message (e.g., an RRC connection reconfiguration message) to the UE 115. The MN 205 may additionally include a resource configuration, a measurement configuration, an MCG configuration, or some combination thereof for the full configuration in the RRC message.

The UE 115 may receive the full configuration and may reconfigure resources based on the full configuration. In some cases, to reconfigure according to a full configuration, the UE 115 may release multiple current dedicated radio configurations (e.g., all except for an MCG cell radio network temporary identifier (C-RNTI) and an access stratum (AS) security configuration associated with a master key) and establish new configurations based on parameters indicated in the full configuration. In some cases, the UE 115 may release the MCG and SCG cell-configurations, but may not release a radio bearer configuration. For example, the initial SCG configuration adopted by the UE 115 may allocate resources for the UE 115 to communicate with the SN 210, but this initial SCG configuration may be replaced (e.g., reset then replaced) by the new SCG configuration in a full configuration reconfiguration process initiated by the MN 205. The UE 115 may implement a new MCG configuration to communicate with the MN 205 in DC communications 230-a and a new SCG configuration to communicate with the SN 210 in DC communications 230-b according to the full configuration. For example, the UE 115 may communicate using a first set of RLC bearers that are part of the MCG configuration and a second set of RLC bearers that are part of the SCG configuration.

Figure 3:
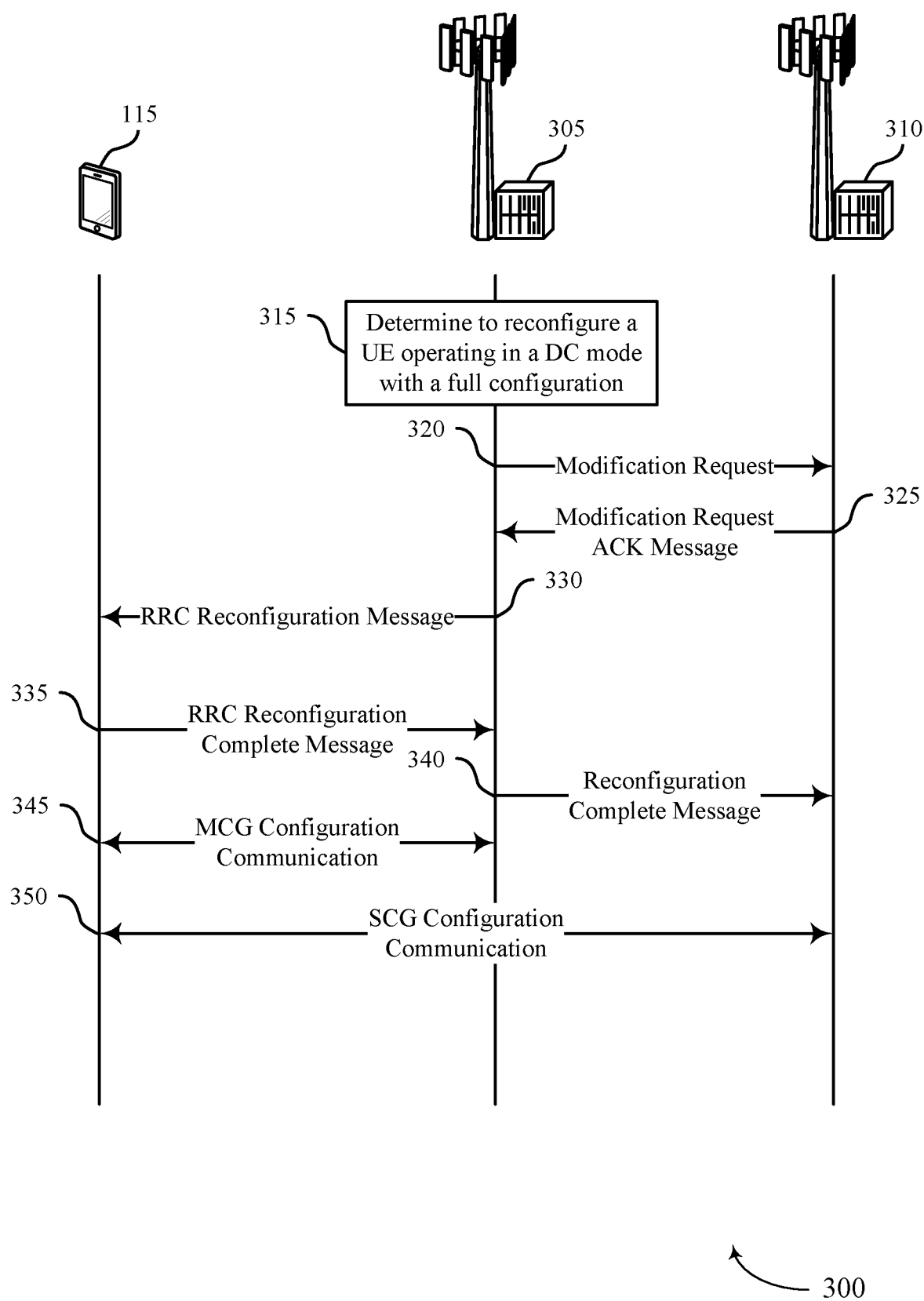
FIGS. 3 and 4 illustrate examples of process flows that support techniques for indicating full configuration to an SN in DC in accordance with various aspects of the present disclosure.

FIG. 3 illustrates an example of a process flow that supports techniques for indicating full configuration to an SN in DC in accordance with various aspects of the present disclosure. In some examples, the process flow 300 may implement aspects of a wireless communications system 100 or a wireless communications system 200 as described with reference to FIGS. 1 and 2. The process flow 300 may include a UE 115 and base stations, which may be examples of a UE 115 and base stations 105 as described with reference to FIGS. 1 and 2. A first base station may be an example of an MN 305 in DC operations and a second base station may be an example of an SN 310 in DC operations. In the following description of the process flow 300, the operations performed by the UE 115, the MN 305, and the SN 310 may be performed in different orders or at different times. Some operations may also be left out of the process flow 300, or other operation may be added to the process flow 300. While the UE 115, the MN 305, and the SN 310 are shown performing a number of the operations of process flow 300, any wireless device may perform the operations shown or described. The process flow 300 may illustrate the signaling of reconfiguration information in DC communications.

At 315, the MN 305 may determine to reconfigure the UE 115 operating in the DC mode with a full configuration. A full configuration reconfiguration may include the reconfiguration of several layers including the lower-layer configurations for different cells—and any updates thereto)—to allow the UE 115 to establish communication with multiple nodes of the DC deployment. For example, the reconfiguration may involve a physical layer reconfiguration, a MAC layer reconfiguration, or a combination thereof.

At 320, the MN 305 may transmit a modification request to the SN 310. The modification request may signal to the SN 310 that a reconfiguration may occur and that the new configuration is a full configuration. The modification request may also indicate to the SN 310 that the current SCG configuration is no longer valid and that a new SCG configuration is requested for the full configuration. Additionally or alternatively, the modification request may apply changes to existing radio bearers and security keys. The modification request may add, release, or modify a radio bearer in addition to signaling the reconfiguration.

At 325, the SN 310 may transmit a modification request ACK message to the MN 305 (e.g., in response to the modification request). The modification request ACK message may include a new SCG configuration in compliance with the full configuration indicated for the UE 115.

At 330, the MN 305 may transmit an RRC connection reconfiguration message to the UE. The RRC connection reconfiguration message may indicate the full configuration for the UE 115, including the new SCG configuration from the SN 310. The RRC connection reconfiguration message may also include a parameter that indicates if the SN 310 was previously released and re-added. In some cases, based on the modification request transmitted at 320 (e.g., as opposed to a release-and-add procedure to retrieve the SCG configuration), the MN 305 may not release the SN 310 when retrieving the SCG configuration and, correspondingly, may set the release-and-add indicator to false. In other cases, this release-and-add indicator may be set to true.

The UE 115 may perform a reconfiguration procedure based on the full configuration received in the RRC connection reconfiguration message. At 335, the UE 115 may transmit an RRC connection reconfiguration complete message to the MN 305. The UE 115 may transmit the RRC connection reconfiguration complete message to indicate to the MN 305 that the new full configuration (e.g., including the SCG configuration complying with the full configuration, an MCG configuration complying with the full configuration, a resource configuration, a measurement configuration, or some combination thereof) is implemented at the UE 115.

At 340, the MN 305 may transmit an SN reconfiguration complete message to the SN 310. The SN reconfiguration complete message may indicate to the SN 310 that the UE 115 is configured with the new SCG configuration and may operate according to the full configuration.

At 345, the UE 115 and the MN 305 may communicate with the full configuration in the DC mode according to the updated MCG configuration. At 350, the UE 115 and the SN 310 may communicate with the full configuration in the DC mode according to the updated SCG configuration.

Figure 4:
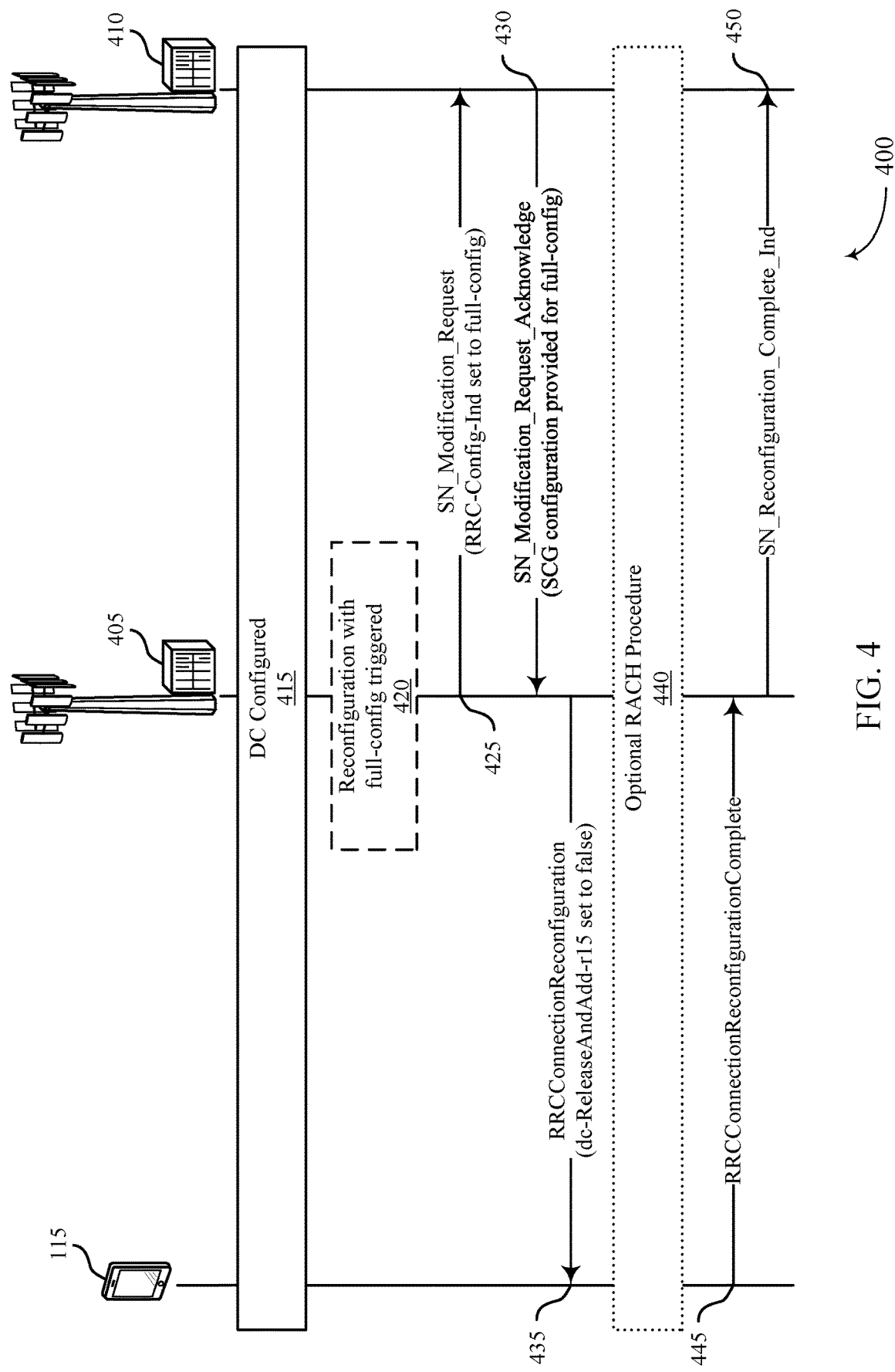

FIG. 4 illustrates an example of a process flow that supports techniques for indicating full configuration to an SN in DC in accordance with various aspects of the present disclosure. In some examples, the process flow 400 may implement aspects of a wireless communications systems 100 or a wireless communications system 200 as described with reference to FIGS. 1 and 2. The process flow 400 includes a UE 115 and base stations, which may be examples of a UE 115 and base stations 105 as described with reference to FIGS. 1 and 2. A first base station may be an example of an MN 405 in DC operations and a second base station may be an example of an SN 410 in DC operations. In the following description of the process flow 400, the operations performed by the UE 115, the MN 405, and the SN 410 may be performed in different orders or at different times. Some operations may also be left out of the process flow 400, or other operations may be added to the process flow 400. While the UE 115, the MN 405, and the SN 410 are shown performing a number of the operations of the process flow 400, any wireless device may perform the operations shown or described. The process flow 400 may further illustrate the signaling of reconfiguration information in DC communications.

At 415, the UE 115 may be configured in a DC mode, where the UE 115 may communicate with the MN 405 in an MCG and with the SN 410 in an SCG. The UE 115 may concurrently maintain connections with the MN 405 and the SN 410. In some cases, the UE 115 may communicate concurrently with the MN 405 and the SN 410 using an aggregate bandwidth. Each or either of the MN 405 and the SN 410 may be associated with NR connectivity, E-UTRA connectivity, NGC connectivity, or some combination thereof.

At 420, the MN 405 may determine to reconfigure the UE 115 with a full configuration. The full configuration reconfiguration may be triggered by the MN 405 and may initiate a reconfiguration process. A full configuration may cause the UE 115 to reconfigure the physical layer, the MAC layer, or some combination of these or other layers according to the full configuration. In some cases, a data radio bearer may not be reconfigured in a full configuration process. In some cases, a network may determine when to apply the full configuration.

At 425, the MN 405 may transmit an SN_Modification_Request to the SN 410. The SN_Modification_Request may be an example of a modification request message. The SN_Modification_Request may include an RRC-Config-Ind that is set to full-config. In some cases, the MN 405 may send the indication of the full configuration (e.g., the SN_Modification_Request) in Xn or X2 signaling transmitted to the SN 410. The SN_Modification_Request may provide the configuration to be applied by the SN 410 in the RRC-Config-Ind (e.g., a bit or field indicating the type of configuration for the UE 115).

At 430, the SN 410 may transmit an SN_Modification_Request Acknowledge message to the MN 405 based on receiving the SN_Modification_Request. The SN 410 may provide an SCG configuration in compliance with the full configuration (e.g., a full SCG configuration) for the UE 115 in the SN_Modification_Request Acknowledge. This SCG configuration may be based on the full configuration indicated in the SN_Modification_Request.

At 435, the MN 405 may transmit an RRCConnectionReconfiguration message to the UE 115. The RRCConnectionReconfiguration message may include a dc-ReleaseAndAdd-r15 indication that may be set to true or false to indicate whether the SN 410 was released and re-added in the reconfiguration process. For example, if the SN 410 is not released by the MN 405 when the MN 405 retrieves the SCG configuration for the full configuration, the dc-ReleaseAndAdd-r15 indication may be set to false. In some cases (not shown), when the dc-ReleaseAndAdd-r15 indication is set to true, it may indicate that the SN 410 was released and re-added when the MN 405 determined to reconfigure the UE 115 with the full configuration. In other examples, as shown in FIG. 4, when the dc-ReleaseAndAdd-r15 indication message is set to false, it may indicate that the SN 410 was not released or re-added but provided a full SCG configuration based on the RRC-Config-Ind being set to full-config in the SN_Modification_Request.

At 440, the UE 115, the MN 405, and the SN 410 may perform a random access channel (RACH) procedure. In some cases, the UE 115 may determine whether to perform or to not perform the RACH procedure. In some other cases, the UE 115 may perform the RACH procedure based on the full configuration provided by the MN 405.

At 445, the UE 115 may transmit an RRCConnectionReconfigurationComplete message to the MN 405. This may indicate to the MN 405 that the UE 115 is configured with the full configuration and that the UE 115 is enabled to communicate with the full configuration in the DC mode (e.g., according to an MCG configuration for the MN 405).

At 450, the MN 405 may transmit an SN_RECONFIGURATION_COMPLETE_IND message to the SN 410. This may indicate to the SN 410 that the UE 115 is configured with the full configuration and that the UE 115 is enabled to communicate with the full configuration in the DC mode (e.g., according to the SCG configuration for the SN 410). The SN_RECONFIGURATION_COMPLETE_IND may indicate that the reconfiguration procedure is complete.

Figure 5:
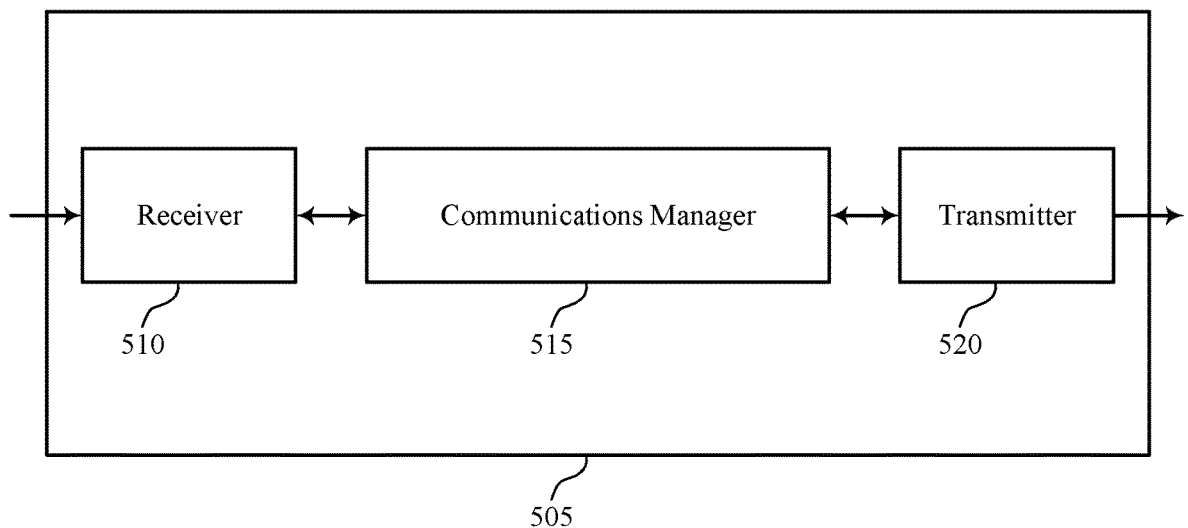
FIGS. 5 and 6 show block diagrams of devices that support techniques for indicating full configuration to an SN in DC in accordance with various aspects of the present disclosure.

FIG. 5 shows a block diagram of a device that supports techniques for indicating full configuration to an SN in DC in accordance with various aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to techniques for indicating full configuration to an SN in DC, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may be implemented at a first device (e.g., a UE). The communications manager 515 may communicate with a second device (e.g., an MN) and a third device (e.g., an SN) in a DC mode, receive, from the second device, an RRC connection reconfiguration message indicating a full configuration for the UE, where the full configuration is based on a modification request message transmitted from the second device to the third device and indicating the full configuration, perform a reconfiguration process according to the full configuration, and communicate with the second device and the third device in the DC mode based on the reconfiguration process. The communications manager 515 may be an example of aspects of the communications manager 810 described herein.

The actions performed by the communications manager 515 as described herein may be implemented to realize one or more potential advantages. For example, the full configuration being based on a modification request message transmitted from the MN to the SN that indicates the full configuration may allow the UE 115 to receive a full configuration without the MN releasing and re-adding the SN. Not releasing and re-adding the SN may reduce the latency involved in the MN determining the full configuration (e.g., determining the SCG configuration for the SN that complies with the full configuration). As such, the UE 115 may perform a low latency reconfiguration based on the SN maintaining a connection with the MN. Additionally, the UE 115 may mitigate data loss due to the shortened reconfiguration process and the SN maintaining the connection throughout the process.

Based on the MN transmitting the indication of the full configuration to the SN (and the SN providing the SCG configuration while remaining connected to the MN), a processor of the UE 115 (e.g., a processor controlling the receiver 510, the communications manager 515, the transmitter 520, etc.) may reduce processing resources used for transmissions. For example, the UE 115 may mitigate data loss and reduce the likelihood of RLF based on the SN maintaining the connection with the MN (e.g., as opposed to performing a release and re-add procedure). As such, the UE 115 may reduce the number of retransmissions performed by the UE 115, reducing a number of times the processor ramps up processing power and turns on processing units to handle uplink message transmission. Further, reducing the number of retransmission processes performed by the UE 115 may reduce the signaling overhead on the channel.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

Figure 6:
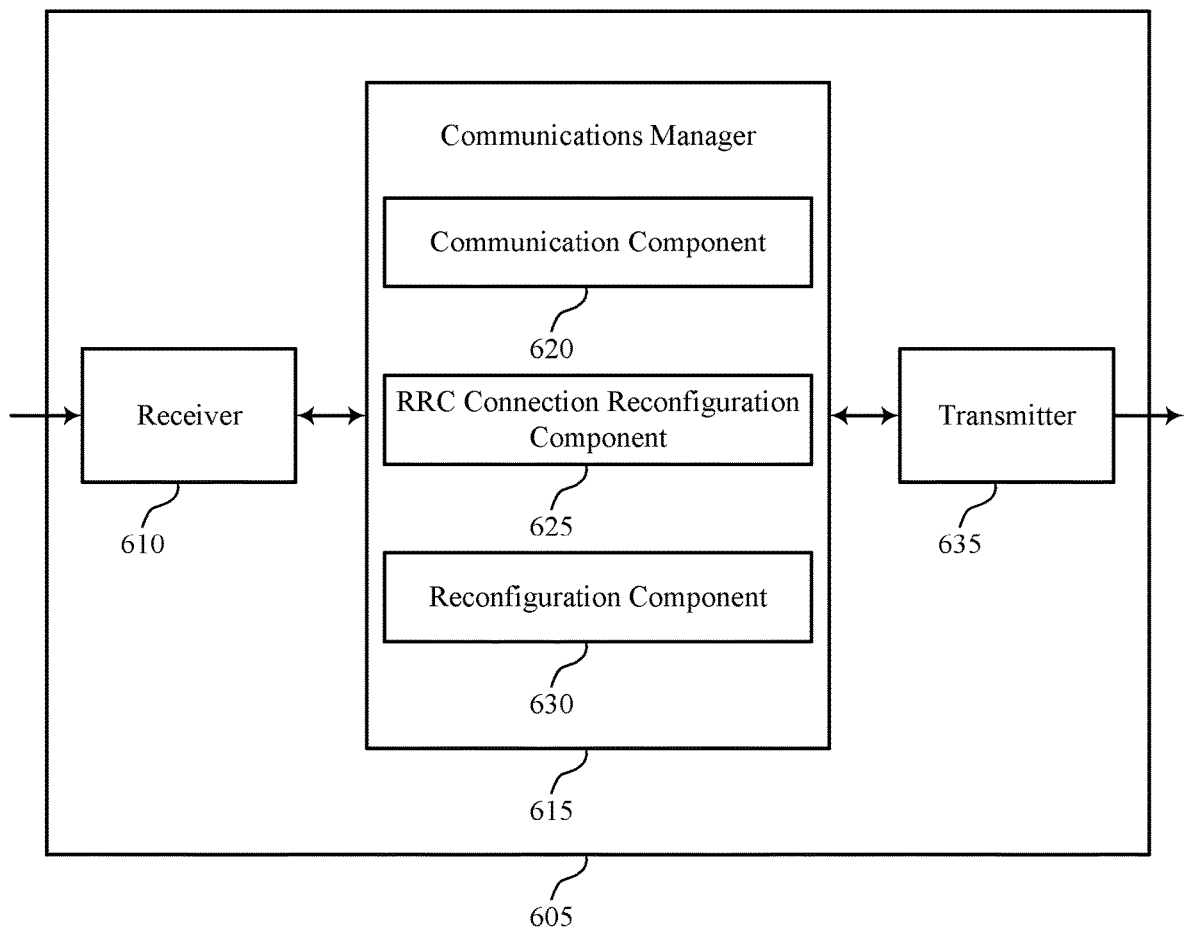

FIG. 6 shows a block diagram of a device that supports techniques for indicating full configuration to an SN in DC in accordance with various aspects of the present disclosure. The device 605 may be an example of aspects of a device 505 or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to techniques for indicating full configuration to an SN in DC, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a communication component 620, an RRC connection reconfiguration component 625, and a reconfiguration component 630. The communications manager 615 may be an example of aspects of the communications manager 810 described herein.

The communication component 620 may communicate with an MN and an SN in a DC mode. The RRC connection reconfiguration component 625 may receive, from the MN, an RRC connection reconfiguration message indicating a full configuration for the UE, where the full configuration is based on a modification request message transmitted from the MN to the SN and indicating the full configuration. The reconfiguration component 630 may perform a reconfiguration process according to the full configuration. The communication component 620 may communicate with the MN and the SN in the DC mode based on the reconfiguration process.

The transmitter 635 may transmit signals generated by other components of the device 605. In some examples, the transmitter 635 may be collocated with a receiver 610 in a transceiver component. For example, the transmitter 635 may be an example of aspects of the transceiver 820 described with reference to FIG. 8. The transmitter 635 may utilize a single antenna or a set of antennas.

Figure 7:
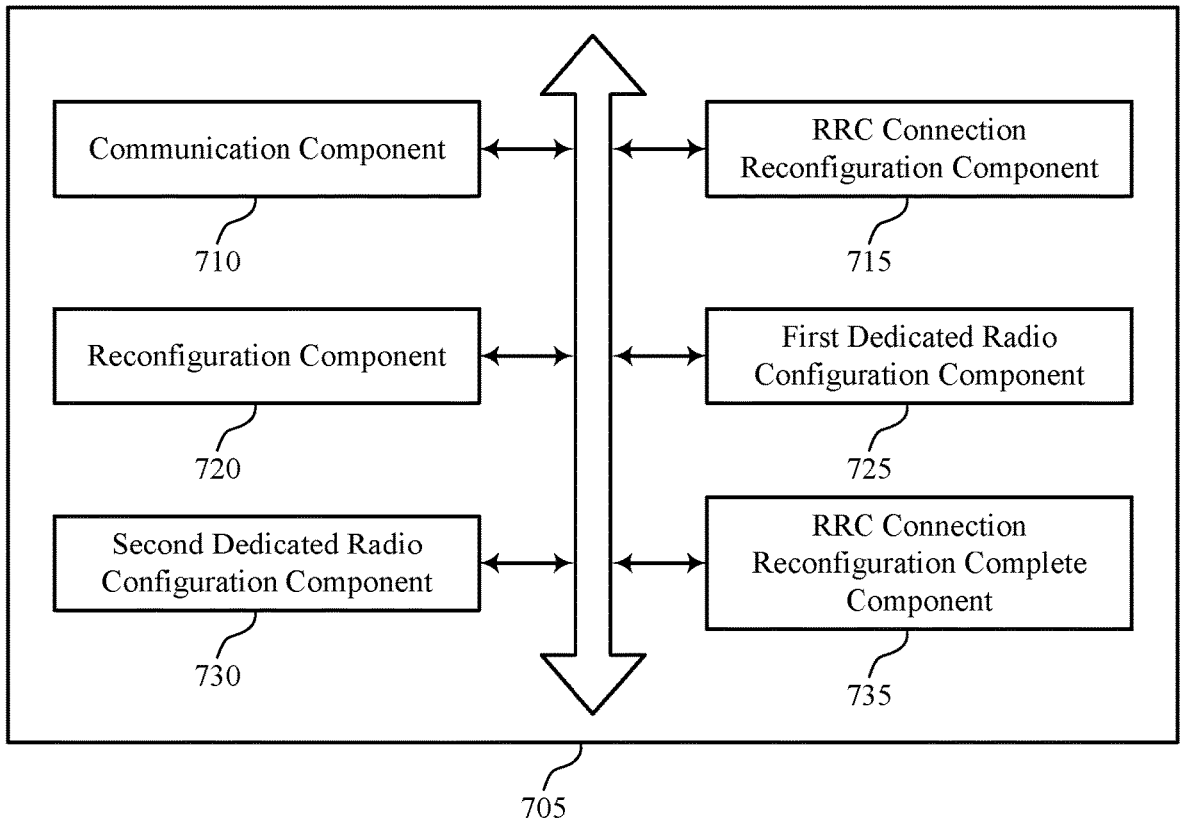
FIG. 7 shows a block diagram of a communications manager that supports techniques for indicating full configuration to an SN in DC in accordance with various aspects of the present disclosure.

FIG. 7 shows a block diagram of a communications manager that supports techniques for indicating full configuration to an SN in DC in accordance with various aspects of the present disclosure. The communications manager 705 may be an example of aspects of a communications manager 515, a communications manager 615, or a communications manager 810 described herein. The communications manager 705 may include a communication component 710, an RRC connection reconfiguration component 715, a reconfiguration component 720, a first dedicated radio configuration component 725, a second dedicated radio configuration component 730, and an RRC connection reconfiguration complete component 735. Each of these components may communicate, directly or indirectly, with one another (e.g., via one or more buses). The communications manager 705 may be implemented at a UE (e.g., a first device).

The communication component 710 may communicate with an MN (e.g., a second device) and an SN (e.g., a third device) in a DC mode. In some cases, the DC mode includes an EUTRA-EUTRA DC mode, an NR-NR DC mode, an NR-EUTRA DC mode, an EUTRA-NR DC mode, an NGC EUTRA-NR DC mode, or a combination thereof.

The RRC connection reconfiguration component 715 may receive, from the MN, an RRC connection reconfiguration message indicating a full configuration for the UE, where the full configuration is based on a modification request message transmitted from the MN to the SN and indicating the full configuration. In some cases, a DC release-and-add indicator of the RRC connection reconfiguration message is set to false.

In some cases, the RRC connection reconfiguration message further indicates an SCG configuration complying with the full configuration, a resource configuration, and a measurement configuration for the UE, where the reconfiguration process is further based on the SCG configuration, the resource configuration, and the measurement configuration.

The reconfiguration component 720 may perform a reconfiguration process according to the full configuration. The first dedicated radio configuration component 725 may release a set of first dedicated radio configurations based on the full configuration. The second dedicated radio configuration component 730 may establish a set of second dedicated radio configurations according to the full configuration.

The RRC connection reconfiguration complete component 735 may transmit, to the MN, an RRC connection reconfiguration complete message in response to the RRC connection reconfiguration message and based on performing the reconfiguration process.

The communication component 710 may communicate with the MN and the SN in the DC mode based on the reconfiguration process.

Figure 8:
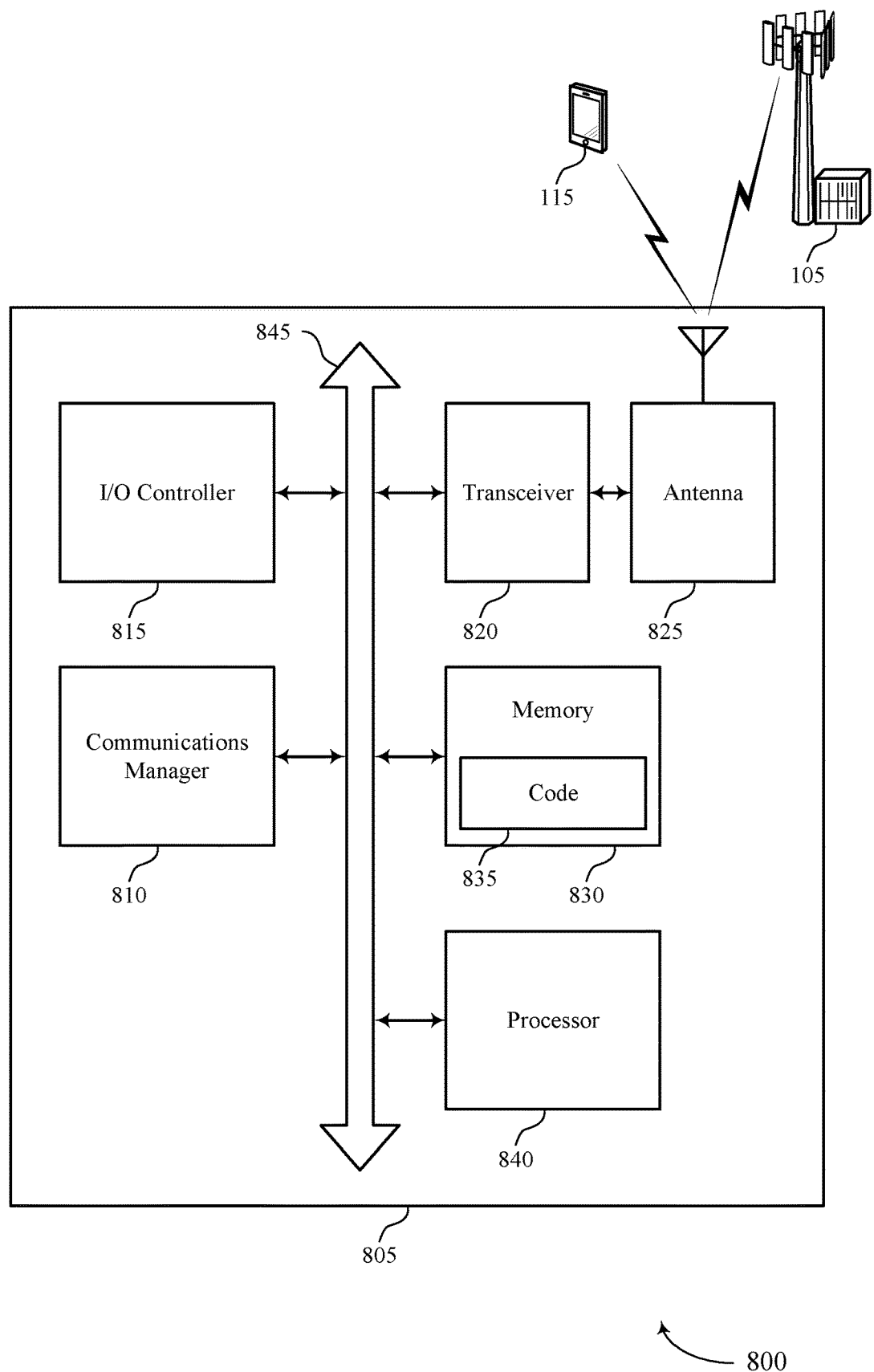
FIG. 8 shows a diagram of a system including a device that supports techniques for indicating full configuration to an SN in DC in accordance with various aspects of the present disclosure.

FIG. 8 shows a diagram of a system including a device that supports techniques for indicating full configuration to an SN in DC in accordance with various aspects of the present disclosure. The system 800 may be an example of a wireless communications system. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 (e.g., implemented at a first device) may communicate with an MN (e.g., a second device) and an SN (e.g., a third device) in a DC mode, receive, from the MN, an RRC connection reconfiguration message indicating a full configuration for the UE, where the full configuration is based on a modification request message transmitted from the MN to the SN and indicating the full configuration, perform a reconfiguration process according to the full configuration, and communicate with the MN and the SN in the DC mode based on the reconfiguration process.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for indicating full configuration to an SN in DC).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
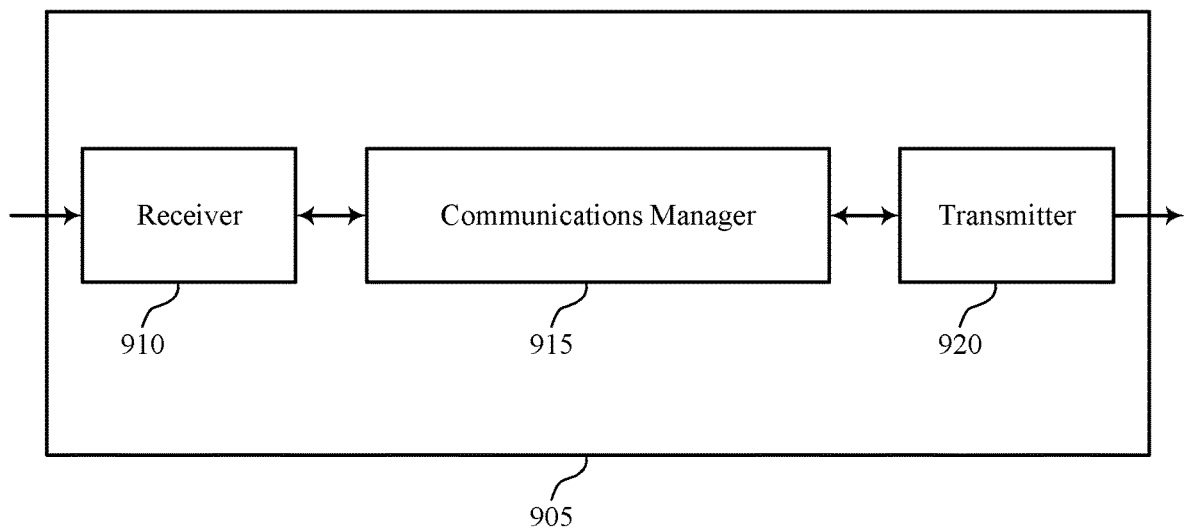
FIGS. 9 and 10 show block diagrams of devices that support techniques for indicating full configuration to an SN in DC in accordance with various aspects of the present disclosure.

FIG. 9 shows a block diagram of a device that supports techniques for indicating full configuration to an SN in DC in accordance with various aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to techniques for indicating full configuration to an SN in DC, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may be implemented at a first device. The communications manager 915, if operating according to MN functionality, may determine to reconfigure a second device (e.g., a UE) operating in a DC mode with a full configuration, transmit, to a third device (e.g., an SN), a modification request message indicating the full configuration based on the determining, and receive, from the third device, a modification request ACK message including an SCG configuration complying with the full configuration.

The communications manager 915, if operating according to SN functionality, may receive, from a second device (e.g., an MN), a modification request message indicating a full configuration reconfiguration for a third device (e.g., a UE) operating in a DC mode, transmit, to the MN, a modification request ACK message including an SCG configuration complying with the full configuration, and communicate with the UE according to the SCG configuration. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver component. For example, the transmitter 920 may be an example of aspects of the transceiver 1220 described with reference to FIG. 12. The transmitter 920 may utilize a single antenna or a set of antennas.

Figure 10:
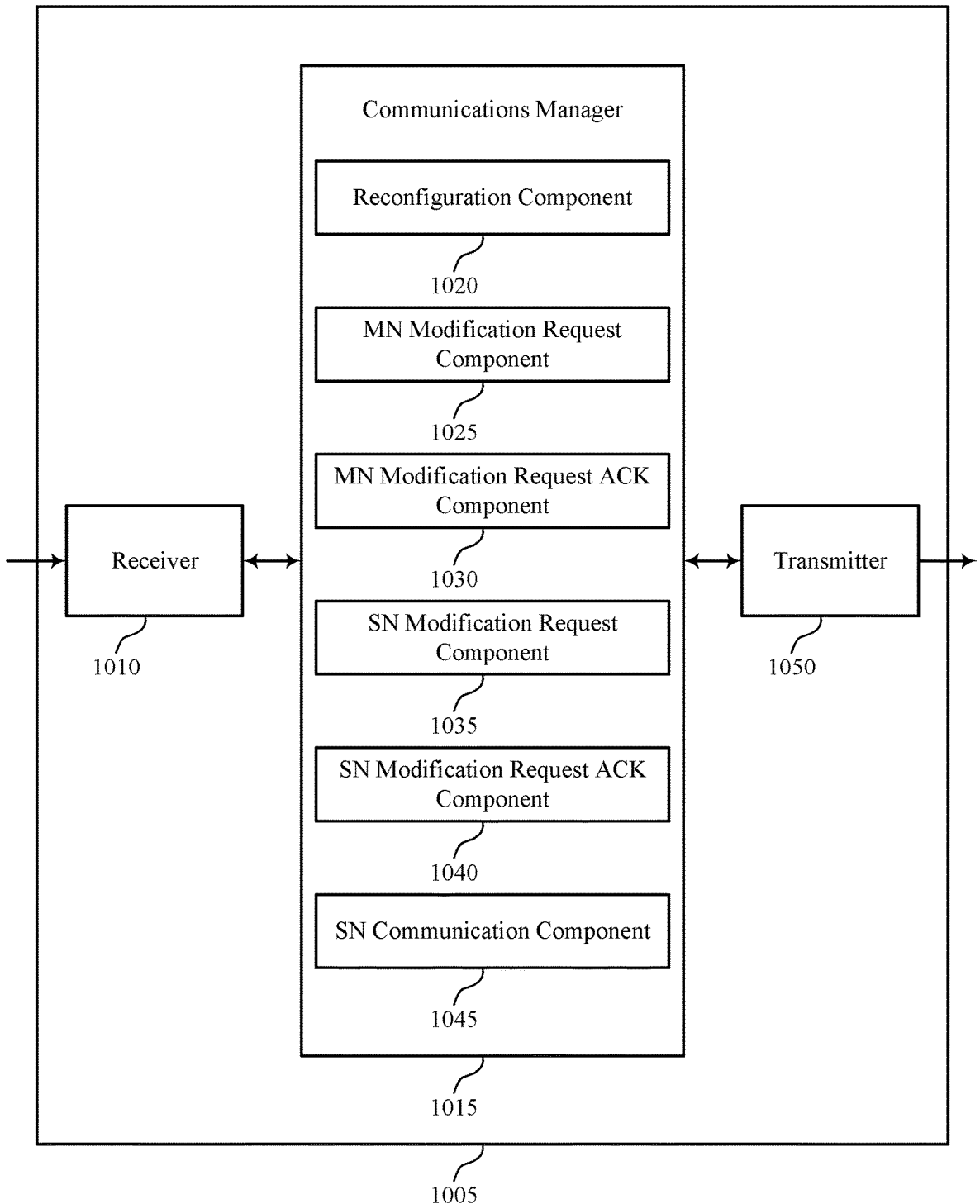

FIG. 10 shows a block diagram of a device that supports techniques for indicating full configuration to an SN in DC in accordance with various aspects of the present disclosure. The device 1005 may be an example of aspects of a device 905, or a base station 105 as described herein. The device 1005 may include a receiver 1010, a communications manager 1015, and a transmitter 1050. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for indicating full configuration to an SN in DC, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a reconfiguration component 1020, an MN modification request component 1025, an MN modification request ACK component 1030, an SN modification request component 1035, an SN modification request ACK component 1040, and an SN communication component 1045. The communications manager 1015 may be an example of aspects of the communications manager 1210 described herein.

The reconfiguration component 1020 may determine to reconfigure a UE (e.g., a second device) operating in a DC mode with a full configuration. The MN modification request component 1025 may transmit, to an SN (e.g., a third device), a modification request message indicating the full configuration based on the determining. The MN modification request ACK component 1030 may receive, from the SN, a modification request ACK message including an SCG configuration complying with the full configuration.

The SN modification request component 1035 may receive, from an MN (e.g., a second device), a modification request message indicating a full configuration reconfiguration for a UE (e.g., a third device) operating in a DC mode. The SN modification request ACK component 1040 may transmit, to the MN, a modification request ACK message including an SCG configuration complying with the full configuration. The SN communication component 1045 may communicate with the UE according to the SCG configuration.

The transmitter 1050 may transmit signals generated by other components of the device 1005. In some examples, the transmitter 1050 may be collocated with a receiver 1010 in a transceiver component. For example, the transmitter 1050 may be an example of aspects of the transceiver 1220 described with reference to FIG. 12. The transmitter 1050 may utilize a single antenna or a set of antennas.

Figure 11:
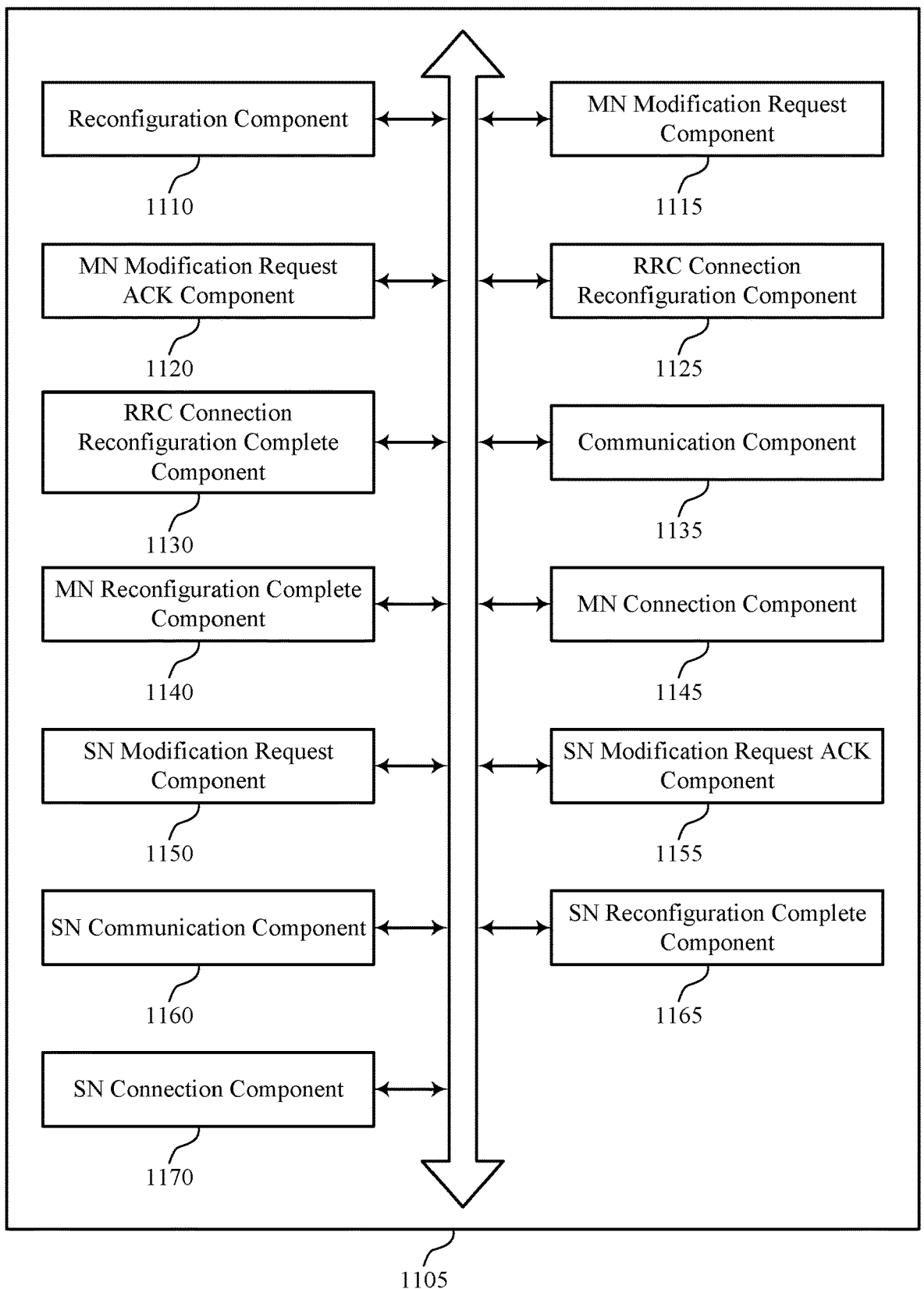
FIG. 11 shows a block diagram of a communications manager that supports techniques for indicating full configuration to an SN in DC in accordance with various aspects of the present disclosure.

FIG. 11 shows a block diagram of a communications manager that supports techniques for indicating full configuration to an SN in DC in accordance with various aspects of the present disclosure. The communications manager 1105 may be an example of aspects of a communications manager 915, a communications manager 1015, or a communications manager 1210 described herein. The communications manager 1105 may include a reconfiguration component 1110, an MN modification request component 1115, an MN modification request ACK component 1120, an RRC connection reconfiguration component 1125, an RRC connection reconfiguration complete component 1130, a communication component 1135, an MN reconfiguration complete component 1140, an MN connection component 1145, an SN modification request component 1150, an SN modification request ACK component 1155, an SN communication component 1160, an SN reconfiguration complete component 1165, and an SN connection component 1170. Each of these components may communicate, directly or indirectly, with one another (e.g., via one or more buses). The communications manager 1105 may be implemented at a first device (e.g., a base station operating as an MN or an SN).

The reconfiguration component 1110 may determine to reconfigure a UE (e.g., a second device) operating in a DC mode with a full configuration. In some examples, the reconfiguration component 1110 may determine to reconfigure the UE with the full configuration based on performing a handover procedure for the UE to a cell applying the full configuration, performing a PDCP bearer type change to the full configuration, modifying a dedicated physical configuration to the full configuration, or a combination thereof. In some cases, the full configuration indicates for the UE to release a set of first dedicated radio configurations and establish a set of second dedicated radio configurations according to the full configuration. In some cases, the DC mode includes an EUTRA-EUTRA DC mode, an NR-NR DC mode, an NR-EUTRA DC mode, an EUTRA-NR DC mode, an NGC EUTRA-NR DC mode, or a combination thereof.

The MN modification request component 1115 may transmit, to an SN (e.g., a third device), a modification request message indicating the full configuration based on the determining. The MN modification request ACK component 1120 may receive, from the SN, a modification request ACK message including an SCG configuration complying with the full configuration.

The RRC connection reconfiguration component 1125 may transmit, to the UE, an RRC connection reconfiguration message indicating the full configuration and the SCG configuration. In some cases, a DC release-and-add indicator of the RRC connection reconfiguration message is set to false. In some cases, the RRC connection reconfiguration message further indicates a resource configuration and a measurement configuration for the UE.

The RRC connection reconfiguration complete component 1130 may receive, from the UE, an RRC connection reconfiguration complete message in response to the RRC connection reconfiguration message. The MN reconfiguration complete component 1140 may transmit, to the SN, a reconfiguration complete indication message based on receiving the RRC connection reconfiguration complete message. The MN connection component 1145 may maintain a connection with the SN based on transmitting the modification request message.

The communication component 1135 may communicate with the UE according to the full configuration.

Additionally or alternatively, the SN modification request component 1150 may receive, from an MN (e.g., a second device), a modification request message indicating a full configuration reconfiguration for a UE (e.g., a third device) operating in a DC mode. The SN modification request ACK component 1155 may transmit, to the MN, a modification request ACK message including an SCG configuration complying with the full configuration. The SN communication component 1160 may communicate with the UE according to the SCG configuration.

The SN reconfiguration complete component 1165 may receive, from the MN, a reconfiguration complete indication message, where the communicating with the UE is based on the reconfiguration complete indication message. The SN connection component 1170 may maintain a connection with the MN based on receiving the modification request message.

Figure 12:
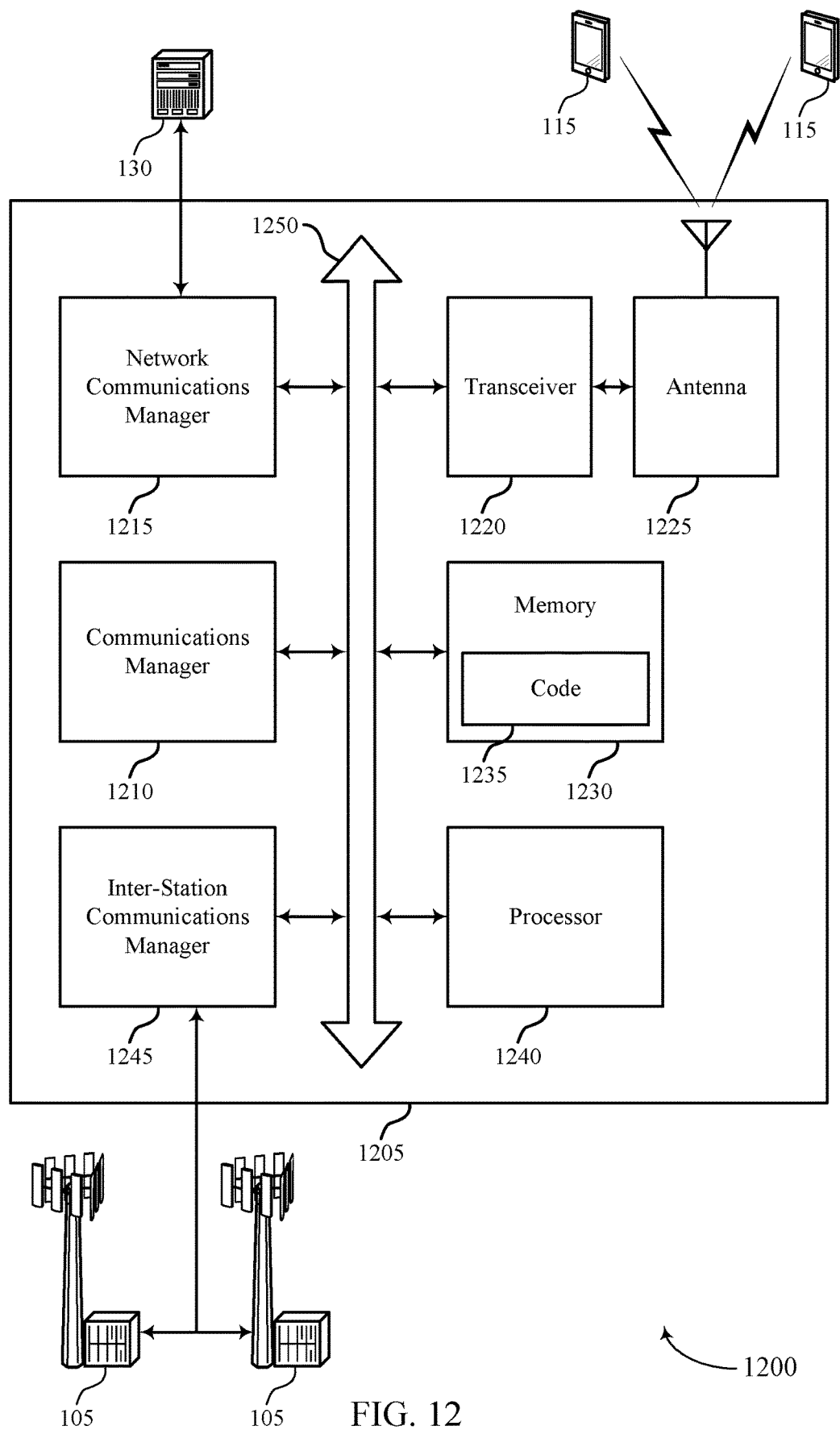
FIG. 12 shows a diagram of a system including a device that supports techniques for indicating full configuration to an SN in DC in accordance with various aspects of the present disclosure.

FIG. 12 shows a diagram of a system including a device that supports techniques for indicating full configuration to an SN in DC in accordance with various aspects of the present disclosure. The system 1200 may be an example of a wireless communications system. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may be implemented at a first device. In some cases, the communications manager 1210 may determine to reconfigure a UE (e.g., a second device) operating in a DC mode with a full configuration, transmit, to an SN (e.g., a third device), a modification request message indicating the full configuration based on the determining, and receive, from the SN, a modification request ACK message including an SCG configuration complying with the full configuration. In some other cases, the communications manager 1210 may receive, from an MN (e.g., a second device), a modification request message indicating a full configuration reconfiguration for a UE (e.g., a third device) operating in a DC mode, transmit, to the MN, a modification request ACK message including an SCG configuration complying with the full configuration, and communicate with the UE according to the SCG configuration.

The network communications manager 1215 may manage communications with the core network 130 (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting techniques for indicating full configuration to an SN in DC).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
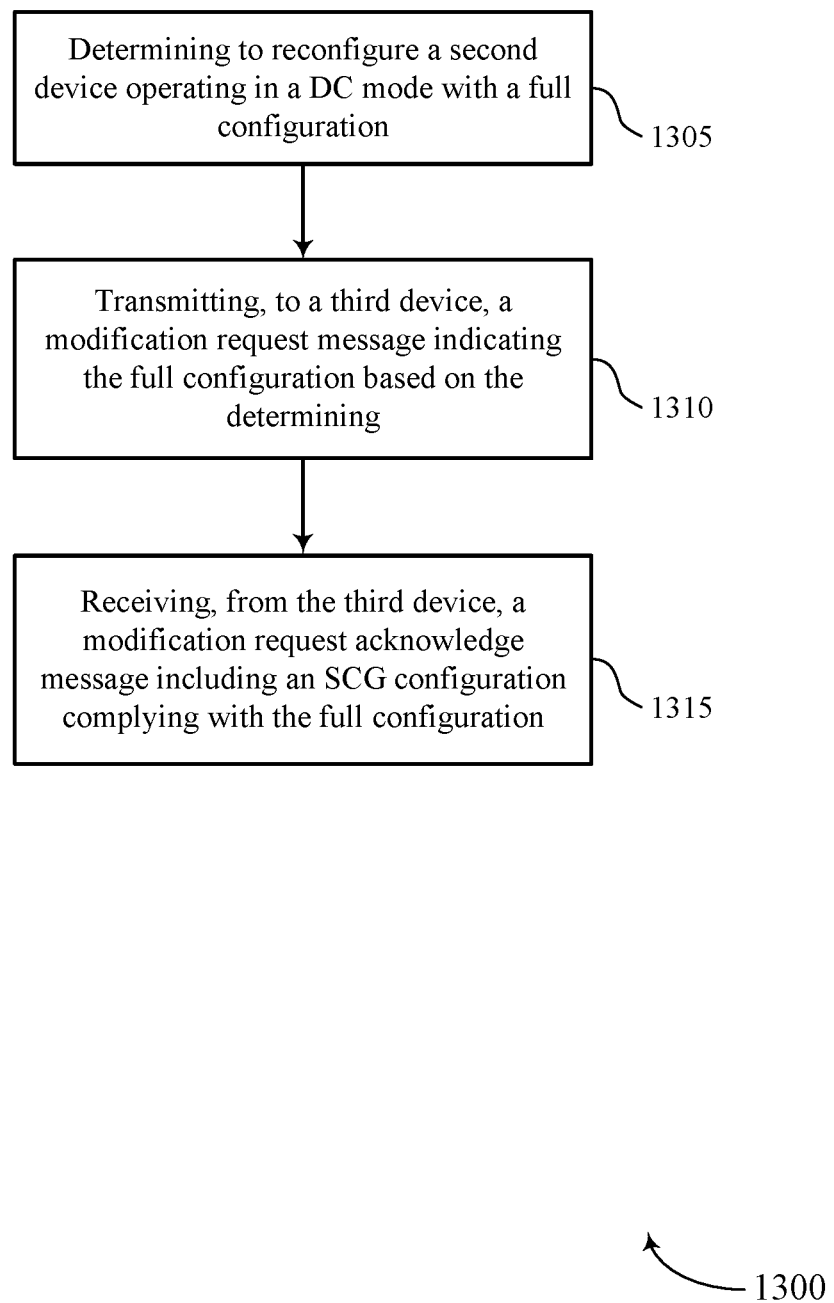
FIGS. 13 through 16 show flowcharts illustrating methods that support techniques for indicating full configuration to an SN in DC in accordance with various aspects of the present disclosure.

FIG. 13 shows a flowchart illustrating a method that supports techniques for indicating full configuration to an SN in DC in accordance with various aspects of the present disclosure. The operations of method 1300 may be implemented by a base station 105 or its components as described herein. For example, the operations of method 1300 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1305, the base station (e.g., a first device operating as an MN) may determine to reconfigure a UE (e.g., a second device) operating in a DC mode with a full configuration. The operations of 1305 may be performed according to the methods described herein. In some examples, aspects of the operations of 1305 may be performed by a reconfiguration component as described with reference to FIGS. 9 through 12.

At 1310, the base station may transmit, to an SN (e.g., a third device), a modification request message indicating the full configuration based on the determining. The operations of 1310 may be performed according to the methods described herein. In some examples, aspects of the operations of 1310 may be performed by an MN modification request component as described with reference to FIGS. 9 through 12.

At 1315, the base station may receive, from the SN, a modification request ACK message including an SCG configuration complying with the full configuration. The operations of 1315 may be performed according to the methods described herein. In some examples, aspects of the operations of 1315 may be performed by an MN modification request ACK component as described with reference to FIGS. 9 through 12.

Figure 14:
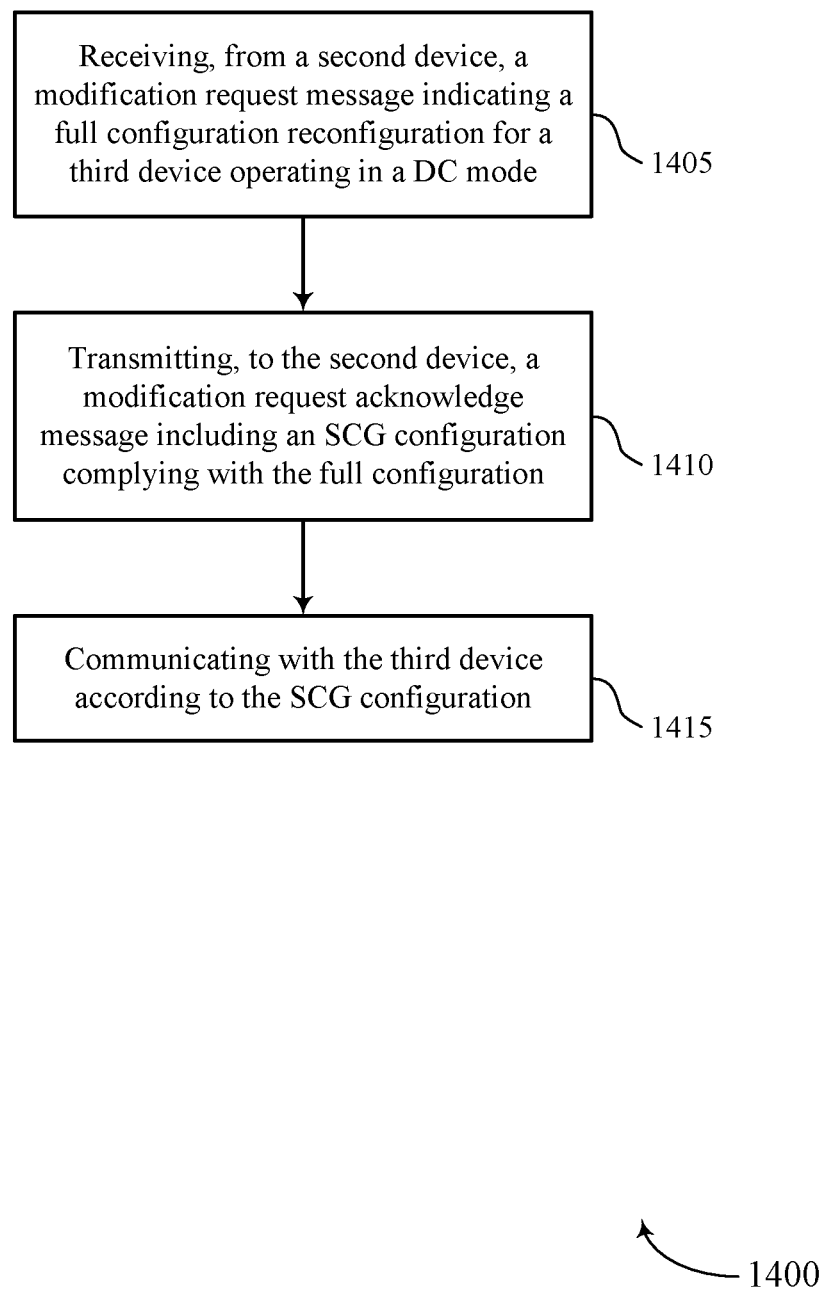

FIG. 14 shows a flowchart illustrating a method that supports techniques for indicating full configuration to an SN in DC in accordance with various aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1405, the base station (e.g., a first device operating as an SN) may receive, from an MN (e.g., a second device), a modification request message indicating a full configuration reconfiguration for a UE (e.g., a third device) operating in a DC mode. The operations of 1405 may be performed according to the methods described herein. In some examples, aspects of the operations of 1405 may be performed by an SN modification request component as described with reference to FIGS. 9 through 12.

At 1410, the base station may transmit, to the MN, a modification request ACK message including an SCG configuration complying with the full configuration. The operations of 1410 may be performed according to the methods described herein. In some examples, aspects of the operations of 1410 may be performed by an SN modification request ACK component as described with reference to FIGS. 9 through 12.

At 1415, the base station may communicate with the UE according to the SCG configuration. The operations of 1415 may be performed according to the methods described herein. In some examples, aspects of the operations of 1415 may be performed by an SN communication component as described with reference to FIGS. 9 through 12.

Figure 15:
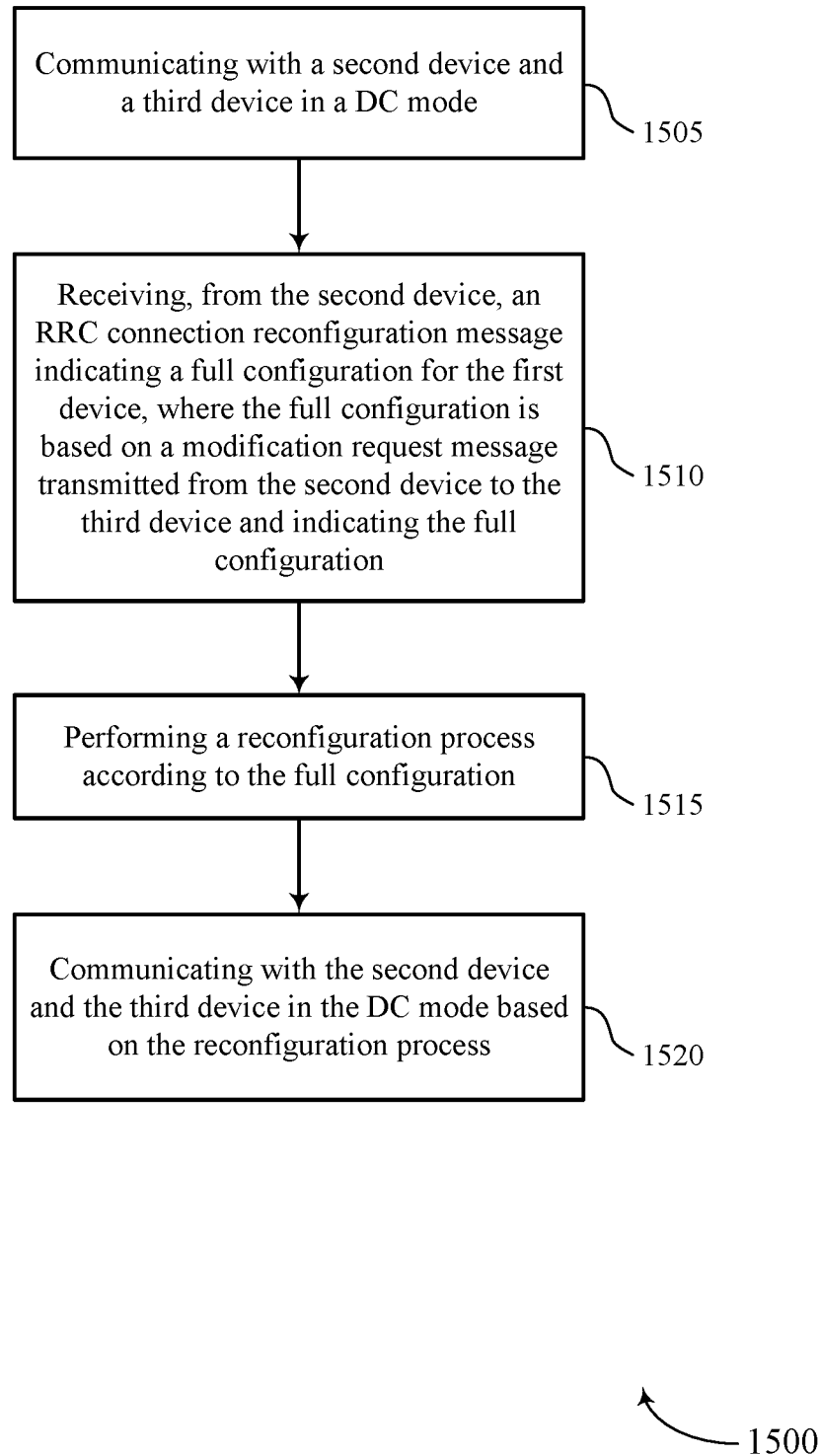

FIG. 15 shows a flowchart illustrating a method that supports techniques for indicating full configuration to an SN in DC in accordance with various aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the UE (e.g., a first device) may communicate with an MN (e.g., a second device) and an SN (e.g., a third device) in a DC mode. The operations of 1505 may be performed according to the methods described herein. In some examples, aspects of the operations of 1505 may be performed by a communication component as described with reference to FIGS. 5 through 8.

At 1510, the UE may receive, from the MN, an RRC connection reconfiguration message indicating a full configuration for the UE, where the full configuration is based on a modification request message transmitted from the MN to the SN and indicating the full configuration. The operations of 1510 may be performed according to the methods described herein. In some examples, aspects of the operations of 1510 may be performed by an RRC connection reconfiguration component as described with reference to FIGS. 5 through 8.

At 1515, the UE may perform a reconfiguration process according to the full configuration. The operations of 1515 may be performed according to the methods described herein. In some examples, aspects of the operations of 1515 may be performed by a reconfiguration component as described with reference to FIGS. 5 through 8.

At 1520, the UE may communicate with the MN and the SN in the DC mode based on the reconfiguration process. The operations of 1520 may be performed according to the methods described herein. In some examples, aspects of the operations of 1520 may be performed by a communication component as described with reference to FIGS. 5 through 8.

Figure 16:
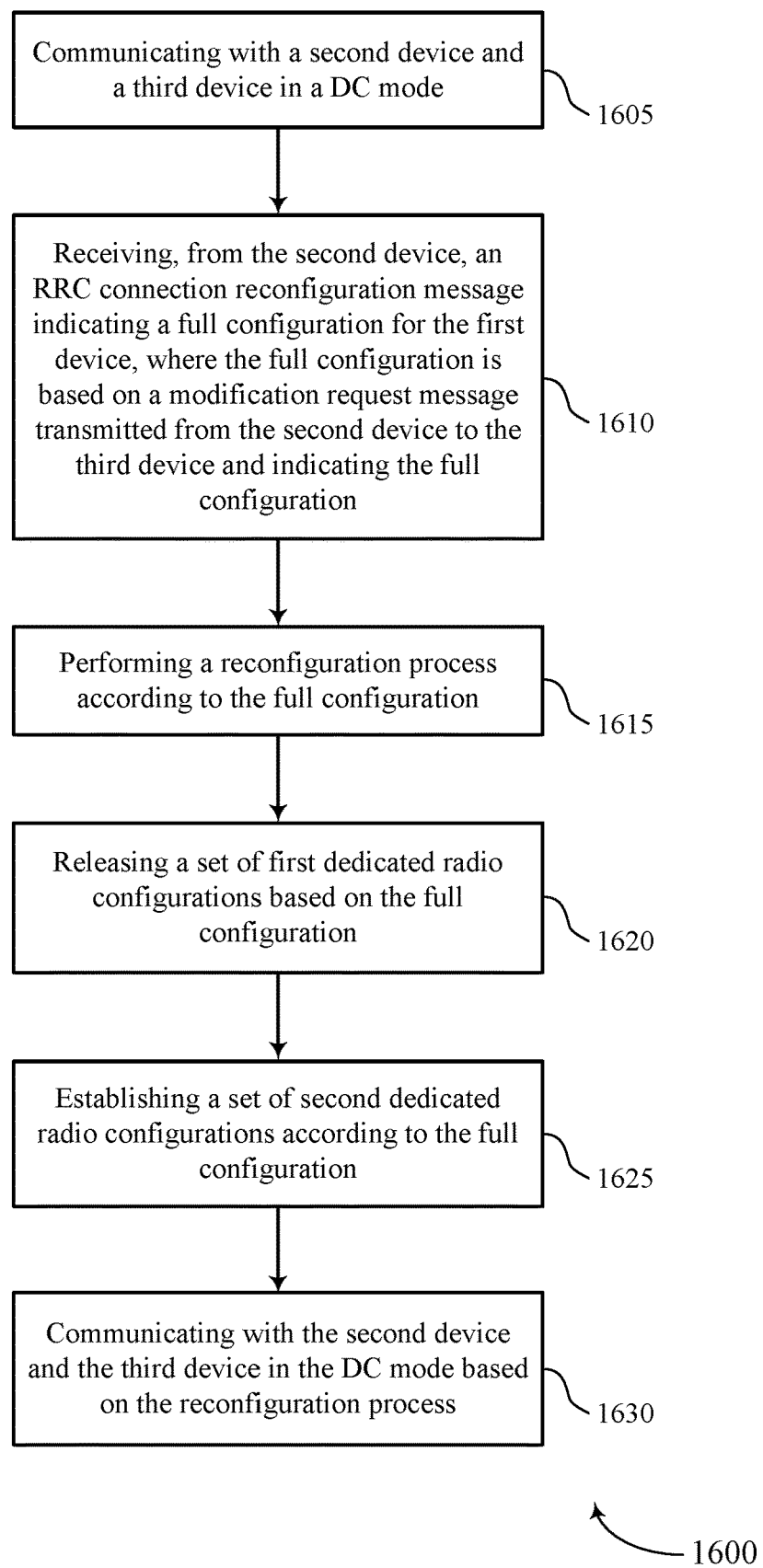

FIG. 16 shows a flowchart illustrating a method that supports techniques for indicating full configuration to an SN in DC in accordance with various aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1605, the UE (e.g., a first device) may communicate with an MN (e.g., a second device) and an SN (e.g., a third device) in a DC mode. The operations of 1605 may be performed according to the methods described herein. In some examples, aspects of the operations of 1605 may be performed by a communication component as described with reference to FIGS. 5 through 8.

At 1610, the UE may receive, from the MN, an RRC connection reconfiguration message indicating a full configuration for the UE, where the full configuration is based on a modification request message transmitted from the MN to the SN and indicating the full configuration. The operations of 1610 may be performed according to the methods described herein. In some examples, aspects of the operations of 1610 may be performed by an RRC connection reconfiguration component as described with reference to FIGS. 5 through 8.

At 1615, the UE may perform a reconfiguration process according to the full configuration. The operations of 1615 may be performed according to the methods described herein. In some examples, aspects of the operations of 1615 may be performed by a reconfiguration component as described with reference to FIGS. 5 through 8.

At 1620, the UE may release a set of first dedicated radio configurations based on the full configuration. The operations of 1620 may be performed according to the methods described herein. In some examples, aspects of the operations of 1620 may be performed by a first dedicated radio configuration component as described with reference to FIGS. 5 through 8.

At 1625, the UE may establish a set of second dedicated radio configurations according to the full configuration. The operations of 1625 may be performed according to the methods described herein. In some examples, aspects of the operations of 1625 may be performed by a second dedicated radio configuration component as described with reference to FIGS. 5 through 8.

At 1630, the UE may communicate with the MN and the SN in the DC mode based on the reconfiguration process. The operations of 1630 may be performed according to the methods described herein. In some examples, aspects of the operations of 1630 may be performed by a communication component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first device, comprising:
   communicating with a second device and a third device in a dual connectivity mode;
   receiving, from the second device, a radio resource control connection reconfiguration message indicating a full configuration for the first device, the full configuration being based at least in part on a modification request message transmitted from the second device to the third device and indicating the full configuration, and a dual connectivity release-and-add indicator of the radio resource control connection reconfiguration message being set to false;
   performing a reconfiguration process according to the full configuration; and
   communicating with the second device and the third device in the dual connectivity mode based at least in part on the reconfiguration process.

2. The method of claim 1, wherein performing the reconfiguration process according to the full configuration comprises:
   releasing a plurality of first dedicated radio configurations based at least in part on the full configuration; and
   establishing a plurality of second dedicated radio configurations according to the full configuration.

3. The method of claim 1, wherein the radio resource control connection reconfiguration message further indicates a secondary cell group configuration complying with the full configuration, a resource configuration, and a measurement configuration for the first device, wherein the reconfiguration process is further based at least in part on the secondary cell group configuration, the resource configuration, and the measurement configuration.

4. The method of claim 1, further comprising:
   transmitting, to the second device, a radio resource control connection reconfiguration complete message in response to the radio resource control connection reconfiguration message and based at least in part on performing the reconfiguration process.

5. The method of claim 1, wherein the dual connectivity mode comprises an evolved universal terrestrial radio access (EUTRA)-EUTRA dual connectivity mode, a new radio (NR)-NR dual connectivity mode, an NR-EUTRA dual connectivity mode, an EUTRA-NR dual connectivity mode, a next generation core (NGC) EUTRA-NR dual connectivity mode, or a combination thereof.

6. The method of claim 1, wherein the first device comprises a user equipment (UE), the second device comprises a master node, and the third device comprises a secondary node.

7. A method for wireless communications at a first device, comprising:
   determining to reconfigure a second device operating in a dual connectivity mode with a full configuration;
   transmitting, to a third device, a modification request message indicating the full configuration based at least in part on the determining;
   receiving, from the third device, a modification request acknowledge message comprising a secondary cell group configuration complying with the full configuration; and
   transmitting, to the second device, a radio resource control connection reconfiguration message indicating the full configuration and the secondary cell group configuration, a dual connectivity release-and-add indicator of the radio resource control connection reconfiguration message being set to false.

8. The method of claim 7, wherein the radio resource control connection reconfiguration message further indicates a resource configuration and a measurement configuration for the second device.

9. The method of claim 7, further comprising:
   receiving, from the second device, a radio resource control connection reconfiguration complete message in response to the radio resource control connection reconfiguration message; and
   communicating with the second device according to the full configuration.

10. The method of claim 9, further comprising:
    transmitting, to the third device, a reconfiguration complete indication message based at least in part on receiving the radio resource control connection reconfiguration complete message.

11. The method of claim 7, further comprising:
    maintaining a connection with the third device based at least in part on transmitting the modification request message.

12. The method of claim 7, wherein the full configuration indicates for the second device to release a plurality of first dedicated radio configurations and establish a plurality of second dedicated radio configurations according to the full configuration.

13. The method of claim 7, wherein determining to reconfigure the second device with the full configuration further comprises:
    performing a handover procedure for the second device to a cell applying the full configuration, performing a packet data convergence protocol bearer type change to the full configuration, modifying a dedicated physical configuration to the full configuration, or a combination thereof.

14. The method of claim 7, wherein the dual connectivity mode comprises an evolved universal terrestrial radio access (EUTRA)-EUTRA dual connectivity mode, a new radio (NR)-NR dual connectivity mode, an NR-EUTRA dual connectivity mode, an EUTRA-NR dual connectivity mode, a next generation core (NGC) EUTRA-NR dual connectivity mode, or a combination thereof.

15. The method of claim 7, wherein the first device comprises a master node, the second device comprises a user equipment (UE), and the third device comprises a secondary node.

16. An apparatus for wireless communications at a first device, comprising:
    a processor;
    memory coupled with the processor; and
    instructions stored in the memory and executable by the processor to cause the apparatus to:
        communicate with a second device and a third device in a dual connectivity mode;
        receive, from the second device, a radio resource control connection reconfiguration message indicating a full configuration for the first device, the full configuration being based at least in part on a modification request message transmitted from the second device to the third device and indicating the full configuration, and a dual connectivity release-and-add indicator of the radio resource control connection reconfiguration message being set to false;
perform a reconfiguration process according to the full configuration; and
communicate with the second device and the third device in the dual connectivity mode based at least in part on the reconfiguration process.

17. The apparatus of claim 16, wherein the instructions to perform the reconfiguration process according to the full configuration are executable by the processor to cause the apparatus to:
release a plurality of first dedicated radio configurations based at least in part on the full configuration; and
establish a plurality of second dedicated radio configurations according to the full configuration.

18. The apparatus of claim 16, wherein the radio resource control connection reconfiguration message further indicates a secondary cell group configuration complying with the full configuration, a resource configuration, and a measurement configuration for the first device, wherein the reconfiguration process is further based at least in part on the secondary cell group configuration, the resource configuration, and the measurement configuration.

19. The apparatus of claim 16, wherein the instructions are further executable by the processor to cause the apparatus to:
transmit, to the second device, a radio resource control connection reconfiguration complete message in response to the radio resource control connection reconfiguration message and based at least in part on performing the reconfiguration process.

20. An apparatus for wireless communications at a first device, comprising:
a processor;
memory coupled with the processor; and
instructions stored in the memory and executable by the processor to cause the apparatus to:
determine to reconfigure a second device operating in a dual connectivity mode with a full configuration;
transmit, to a third device, a modification request message indicating the full configuration based at least in part on the determining;
receive, from the third device, a modification request acknowledge message comprising a secondary cell group configuration complying with the full configuration; and
transmit, to the second device, a radio resource control connection reconfiguration message indicating the full configuration and the secondary cell group configuration, a dual connectivity release-and-add indicator of the radio resource control connection reconfiguration message being set to false.

21. The apparatus of claim 20, wherein the instructions are further executable by the processor to cause the apparatus to:
receive, from the second device, a radio resource control connection reconfiguration complete message in response to the radio resource control connection reconfiguration message; and
communicate with the second device according to the full configuration.

22. The apparatus of claim 21, wherein the instructions are further executable by the processor to cause the apparatus to:
transmit, to the third device, a reconfiguration complete indication message based at least in part on receiving the radio resource control connection reconfiguration complete message.

23. The apparatus of claim 20, wherein the instructions are further executable by the processor to cause the apparatus to:
maintain a connection with the third device based at least in part on transmitting the modification request message.

24. The apparatus of claim 20, wherein the instructions to determine to reconfigure the second device with the full configuration are further executable by the processor to cause the apparatus to:
perform a handover procedure for the second device to a cell applying the full configuration, perform a packet data convergence protocol bearer type change to the full configuration, modify a dedicated physical configuration to the full configuration, or a combination thereof.

* * * * *